United States Patent [19]
Momiyama et al.

[11] Patent Number: 6,023,886
[45] Date of Patent: Feb. 15, 2000

[54] WATER-SUPPLYING APPARATUS CAPABLE OF KEEPING PREDETERMINED WATER LEVEL

[76] Inventors: Eisuke Momiyama; Yasuo Momiyama, both of 45, Aza Nishimukai, Oaza Fuki, Taketoyo-cho Chita-gun, Aichi-ken, Japan

[21] Appl. No.: 09/122,717

[22] Filed: Jul. 27, 1998

[30] Foreign Application Priority Data

Jul. 25, 1997 [JP] Japan ................................. 9-200213
Apr. 17, 1998 [JP] Japan ................................ 10-107552

[51] Int. Cl.$^7$ ................................................. A01G 27/04
[52] U.S. Cl. ............................................................. 47/81
[58] Field of Search .............................. 47/48.5, 79, 81, 47/1.01 R, 82

[56] References Cited

U.S. PATENT DOCUMENTS 3,786,598  1/1974  Stadelhofer ................................. 47/81

FOREIGN PATENT DOCUMENTS

| | | | |
|---|---|---|---|
| 1 447 333 | 6/1965 | France ...................................... | 47/81 |
| 1 517 928 | 6/1968 | France . | |
| 79 00986 | 8/1980 | France ...................................... | 47/79 |
| 2 469 870 | 5/1981 | France . | |
| 837 332 | 4/1952 | Germany ................................. | 47/79 |
| 93 19 107 | 3/1994 | Germany . | |
| 51-34834 | 8/1976 | Japan . | |
| 6-46450 | 6/1994 | Japan . | |
| 2 139 465 | 11/1984 | United Kingdom ....................... | 47/79 |
| 2 308 797 | 7/1997 | United Kingdom . | |

*Primary Examiner*—Michael J. Carone
*Assistant Examiner*—Jeffrey L. Gellner
*Attorney, Agent, or Firm*—Jacobson, Price, Holman & Stern, PLLC

[57] ABSTRACT

A water-supplying apparatus, which can keep a predetermined water level therein, includes a water-supplying device, and a water distributor. The water-supplying device includes a water reservoir, a water-supplying container, and a holder. The water reservoir holds water therein to a predetermined water level. The water-supplying container has an opened end and a closed end, and is disposed in an inverted manner so that the opened end is positioned in the water held in the water reservoir. The holder holds the water-supplying container detachably in the water reservoir in the inverted manner. The water distributor includes a water-distributing member, and a cover member. The water-distributing member has a predetermined length, opposite ends and a peripheral portion, and distributes water by a capillary action from one of the opposite ends to another thereof. The cover member covers the peripheral portion of the water-distributing member excepting the opposite ends thereof, and inhibits water from leaking. One of the opposite ends of the water-distributing member is immersed in the water held in the water reservoir of the water-supplying device, and the other one of the opposite ends of the water-distributing member is disposed in a region where roots of a plant can be supplied with water. The water-supplying apparatus can water the plant without shortage or overflow for a long period of time unattendedly.

8 Claims, 18 Drawing Sheets

WATER-SUPPLYING APPARATUS CAPABLE OF KEEPING PREDETERMINED WATER LEVEL

BACKGROUND OF THE INVENTION

1. Field of the Invention

The present invention relates to a water-supplying apparatus which can keep a predetermined water level therein. The water supplying apparatus can supply water to the roots of a plant without shortage or overflow for a long period of time.

2. Description of the Prior Art

Conventionally, when supplying water to the roots of a plant which is planted in the flowerpot, water is sprinkled from above a flowerpot, for example. The excessive water is discharged through a discharge opening which is formed in the bottom of the flowerpot.

When the water is thus supplied and a person in charge of supplying the water is absent from home for a long period of time, the water runs out. In order to inhibit the water from running out, a reservoir capable of holding a predetermined water therein is disposed at the bottom of the flowerpot so that the discharge opening is covered with the water. If such is the case, the roots are always brought into contact with the excessive water, and are spoiled accordingly.

Hence, there are proposed a few water-supplying apparatuses which can supply water to the roots of a plant without shortage or overflow, and which have the following arrangements.

Examined Japanese Utility Model Publication (KOKOKU) No. 51-34,834, for instance, discloses a conventional water-supplying water. The conventional water-supplying apparatus comprises a container holding water therein, and a pipe-shaped member. The container is disposed under a flowerpot, and is opened at the top end. The pipe-shaped member includes a water-supplying member, is opened at the bottom, and is placed in the water held in the container. The water-supplying member of the pipe-shaped member is fitted at the top into a discharge opening of the flowerpot. The thus constructed conventional water-supplying apparatus can supply the water into the flowerpot through the discharge opening of the flowerpot by the water-supplying ability of the water-supplying member.

Moreover, Unexamined Japanese Utility Model Publication (KOKAI) No. 6-46,450 discloses another conventional water-supplying apparatus which employs a different arrangement. This conventional water-supplying apparatus distributes water to a flowerpot by utilizing a capillary action.

The conventional water-supplying apparatus disclosed in Examined Japanese Utility Model Publication (KOKOKU) No. 51-34,834, however, requires a large space directly below the flowerpot in order to place the container which is opened at the top, and which holds the water therein. The conventional water-supplying apparatus can keep a predetermined water at the initial point of service when water level is supplied to the top-end-opened container. However, the conventional water-supplying apparatus varies the water level to decrease to lower sides after a certain period of time is elapsed from the initial point. Hence, it is always necessary to observe the conventional water-supplying apparatus for the timing to replenish the water held in the container.

Whilst, in the other conventional water-supplying apparatus disclosed in Unexamined Japanese Utility Model Publication (KOKAI) No. 6-46,450, the predetermined water level is not set such that it is below the cultured earth which is held in the flowerpot. This conventional water-supplying apparatus can distribute water to the flowerpot by utilizing a capillary action. However, even after the water distribution saturates the cultured-earth region in the flowerpot, the conventional water-supplying apparatus keeps on distributing water to the flowerpot until the water held in the water source runs out completely. Consequently, there arises a problem in that the distributed water leaks to the outside of the flowerpot.

SUMMARY OF THE INVENTION

The present invention has been developed in view of the aforementioned circumstances. It is therefore an object of the present invention to provide a noble water-supplying apparatus which can keep a predetermined water level, and which is free from the problems associated with the conventional water-supplying apparatuses. For instance, once a water-supplying apparatus according to the present invention (hereinafter simply referred to as the "present water-supplying apparatus") is replenished with water, it can maintain a predetermined water level at the initial point of service for a long period of time even after it is left alone. Further, the present water-supplying apparatus can keep on distributing water until the water held in a water reservoir is consumed. Furthermore, the present water-supplying apparatus can stably supply the water without varying the predetermined water level. Moreover, the present water-supplying apparatus does not cause the problems which result from the water leakage to the outside of a flowerpot.

In an aspect of the present invention, the present water-supplying apparatus comprises:

a water-supplying device including a water reservoir holding water therein to a predetermined water level, a water-supplying container having an opened end and a closed end, disposed in an inverted manner so that the opened end is positioned in the water held in the water reservoir, and a holder holding the water-supplying container detachably in the water reservoir in the inverted manner; and a water distributor including a water-distributing member having a predetermined length, opposite ends and a peripheral portion, and distributing water by a capillary action from one of the opposite ends to another thereof, and a cover member covering the peripheral portion of the water-distributing member excepting the opposite ends thereof and inhibiting water from leaking, one of the opposite ends of the water-distributing member being immersed in the water held in the water reservoir of the water-supplying device, and the other one of the opposite ends of the water-distributing member being disposed in a region where roots of a plant can be supplied with water.

In the above-described present water-supplying apparatus, the water-supplying container is held detachably by the holder, and is disposed in the inverted manner so that the opened end is positioned in the water held in the water reservoir. The water-supplying container supplies the water to the water reservoir. The water reservoir can receive the water to a predetermined level therein, because there is provided an interval between the inner bottom of the water reservoir and the opening of the inverted water-supplying container. Moreover, the predetermined water level can be kept always below the cultured-earth region of a flowerpot.

Hence, once the water reservoir is replenished with water through the opening of the inverted water-supplying container, the predetermined water level can be maintained at the initial point of service for a long period of time even after the water reservoir is left alone. Moreover, the water held in the water reservoir can be supplied to the cultured-earth region of the flowerpot, which is placed above the predetermined water level, stably and without shortage or overflow for a long period of time.

Keeping the predetermined water level always below the cultured-earth region of the flowerpot means that the water held in the water reservoir at the predetermined water level can be distributed to the roots of a plant, which is present above the predetermined water level, in an amount required only of the plant by utilizing the capillary action of the water distributor. Moreover, the water absorbed in the cultured-earth region can be controlled naturally so that the water content is less than the saturated content.

Specifically, as the content of the water absorbed in the cultured-earth region approaches the saturated content, the water being distributed to the flowerpot is reduced naturally. When the water content reaches the saturated content, it is possible to stop the water distribution. Thus, it is possible to get rid of the water leakage from the flowerpot to the outside, water leakage which results from the water distributed in excess of the saturated content.

The predetermined water level is set below the bottom of the flowerpot. As a result, the capillary action of the water distributor can be utilized effectively, and the amount of the water being distributed above the predetermined water level can be controlled appropriately.

When the water distributor distributes the water to the cultured-earth region, which is present above the predetermined water level, by the capillary action, the cultured earth keeps on absorbing the water by its own capillary action up to a predetermined amount (i.e., the saturated content). Since the present water-supplying apparatus distributes the water which is held in the water reservoir at the predetermined water level which is positioned below the cultured-earth region, the water distribution can be controlled and stopped so as not to distribute the water in an excessive amount when the water absorption reaches the saturated content. As a result, once the water is distributed to the cultured-earth region, the water little leaks to the outside. Thus, the present water-supplying apparatus does not wet the floor or make it dirty by leaking the water from the flowerpot to the outside.

In accordance with a further aspect of the present invention, the water-supplying container of the present water-supplying apparatus can be provided with a check valve at the opened end, the check valve being closed to inhibit water from leaking through the opened end when the water-supplying container is held and transferred in the inverted manner; and the water reservoir can be provided with a riser for opening the check valve, the riser pushing up the check valve to open when the water-supplying container is installed to the water reservoir in the inverted manner.

In addition to the operations and advantages carried out by the above-described present water-supplying apparatus, the thus arranged present water-supplying apparatus can carry out the following extra operations and advantages: the water leaks through the opening of the water-supplying container to the water reservoir only while the water-supplying container is inverted and the holder holds the inverted water-supplying container detachably in the water reservoir. The water held in the water-supplying container is not supplied to the water reservoir until the riser of the water reservoir pushes up the check valve to forcibly open the opening against the hydraulic pressure exerted in the water-supplying container. The predetermined water level is thereafter maintained in the water reservoir. As a result, the water held in the water-supplying container can be utilized without loss.

In accordance with a further aspect of the present invention, the water-supplying device can include a plurality of the holders detachably holding a plurality of the water-supplying containers in the water reservoir in the inverted manner.

In addition to the operations and advantages carried out by the above-described present water-supplying apparatus, the thus arranged present water-supplying apparatus can carry out the following extra operations and advantages: a plurality of the holders detachably hold a plurality of the inverted water-supplying containers in the water reservoir. The water can be replenished from the water-supplying containers to the water reservoir in an increased amount. Accordingly, the water distributor can distribute the water from the water reservoir to the cultured-earth region stably and without shortage or overflow for a longer period of time which is extended by the increased water replenishment. As a result, the thus arranged present water-supplying apparatus can be applied to a flowerpot of large volume, or a planter, which holds the cultured earth in a large amount therein.

In accordance with a further aspect of the present invention, the holder of the water-supplying device can be formed in the water reservoir.

In addition to the operations and advantages carried out by the above-described present water-supplying apparatus, the thus arranged present water-supplying apparatus can carry out the following extra operations and advantages: the holder is formed integrally with the water reservoir so that it detachably holds the inverted water-supplying container in the water reservoir. As a result, the thus arranged present water-supplying apparatus can involve a reduced number of the component members.

In accordance with a further aspect of the present invention, the holder of the water-supplying device cam include an opening being communicated with the water held in the water reservoir.

In addition to the operations and advantages carried out by the above-described present water-supplying apparatus, the thus arranged present water-supplying apparatus can carry out the following extra operations and advantages: the water can be smoothly supplied from the water-supplying container to the water reservoir through the opening formed in the holder.

In accordance with a further aspect of the present invention, the water-supplying device can further include a table on which a container planted with a plant is placed.

In addition to the operations and advantages carried out by the above-described present water-supplying apparatus, the thus arranged present water-supplying apparatus can carry out the following extra operations and advantages: the table can be held stably by the weight of the container. Moreover, based on the predetermined water level, the height can be determined securely where the cultured-earth region of the container is present, and in which the water is distributed.

In accordance with a further aspect of the present invention, a plurality of the water-supplying devices can be disposed on an identical plane; and the water distributor can further include a plurality of extension water distributors, the extension water distributor disposed between the neighboring water-supplying devices, and including an extension water-distributing member and an extension cover member, the extension water-distributing member having a predetermined length, opposite ends and a peripheral portion, the extension cover member covering the peripheral portion of the extension water-distributing member excepting the opposite ends thereof, and inhibiting water from leaking, one of the opposite ends of the extension water-distributing member being immersed in the water held in the water reservoir of one of the neighboring water-supplying devices, and the other one of the opposite ends of the extension water-distributing member being immersed in the water held in the water reservoir of another one of the neighboring water-supplying devices.

In addition to the operations and advantages carried out by the above-described present water-supplying apparatus, the thus arranged present water-supplying apparatus can carry out the following extra operations and advantages: the water can be replenished from the water reservoirs in the cultured-earth region through the water-distributing member by way of the extension water-supplying members stably and without shortage or overflow for a much longer period of time, because the water reservoirs of the water-supplying devices are communicated with each other by the extension water-distributing members so that the water reservoirs can transfer the water with each other. As a result, the thus arranged present water-supplying apparatus can be applied to a flowerpot of much larger volume, or a planter, which holds the cultured earth in a much larger amount therein.

In accordance with a further aspect of the present invention, the predetermined water level of the water held in the water reservoir of the water-supplying device can be disposed below the region where roots of a plant can be supplied with water.

If such is the case, the water held in the water reservoir can be distributed to the roots of a plant in an amount required only of the plant by utilizing the capillary action of the water distributor. Moreover, the water absorbed in the region, where the roots of a plant are present, can be controlled naturally so that the water content is less than the saturated content.

In accordance with a further aspect of the present invention, the opened end of the water-supplying container can be flush with the predetermined water level.

If such is the case, as soon as the water held in the water reservoir is below the predetermined water level, air gets into the water-supplying container via the opened end. Accordingly, the air pushes the water held in the water-supplying container out into the water reservoir via the opened end. Thus, as soon as the water held in the water reservoir is consumed, the water reservoir can be replenished with the water held in the water-supplying container.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
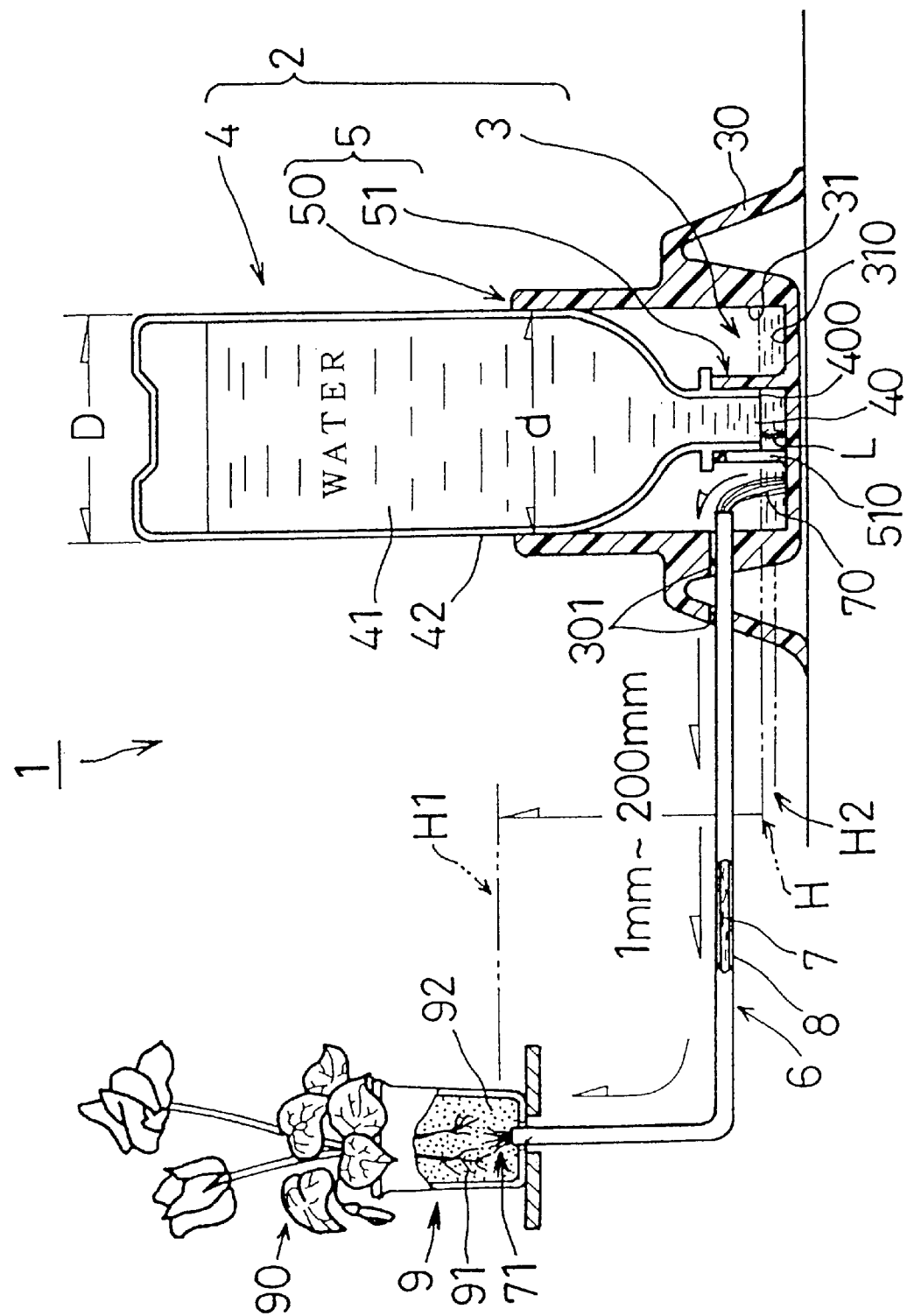
FIG. 1 is a partial cross-sectional and perspective view of a First Preferred Embodiment of the present water-supplying apparatus, and roughly illustrates how to use it.

Having generally described the present invention, a further understanding can be obtained by reference to the specific preferred embodiments which are provided herein for purposes of illustration only and are not intended to limit the scope of the appended claims.

The present water-supplying apparatus comprises the water-supplying device, and the water distributor.

The water-supplying device includes the water reservoir, the water-supplying container, and the holder. Further, the water-supplying device can include a plurality of the holders for holding a plurality of the water-supplying containers detachably in the water reservoir in the inverted manner. Furthermore, the water-supplying device can include a table on which a container planted with a plant is placed.

The water reservoir can be formed as a dent or concave. The dent or concave has a predetermined depth so that it can hold a predetermined amount of water therein. Thus, the water reservoir can receive water to a predetermined level therein.

The water-supplying container is formed as a cylinder shape, and has an opening at one of the opposite ends and a bottom at another one thereof For example, the water-supplying container can be made by recycling used resin bottles, glass bottles or metal bottles which hold drinking water or liquefied seasonings therein. The used resin bottles can be used PET (polyethylene terephthalate) bottles.

The water-supplying container can be provided with a check valve at the opened end. The check valve is closed when the water-supplying container is held and transferred in the inverted manner to inhibit water from leaking through the opened end. The check valve can be formed as a ball or tongue shape.

Note that, when the water-supplying container is provided with the check valve at the opened end and when it is installed to the holder in the inverted manner for service, the water reservoir is provided with a riser for opening the check valve. The riser pushes up the check valve to open when the water-supplying container is installed to the water reservoir in the inverted manner. The riser can be formed so that it stands erect from the water reservoir and fits into the opening of the water-supplying container. For instance, the riser can be formed as a rod, cylinder or projection which has an outside diameter smaller than the inside diameter of the opening. Moreover, the riser can be formed integrally with the water reservoir, or it can be formed independently of the water reservoir and thereafter installed to the water reservoir.

The holder can be a member which can hold the inverted water-supplying container, filled with water, detachably in the water reservoir. For example, the holder can include an outer-periphery holding portion, and an opened-end holding portion. The outer-periphery holding portion holds an outer peripheral wall of the inverted water-supplying container. The opened-end holding portion holds the opened end of the water-supplying container away from and above an inner bottom of the water reservoir by an interval of from 2 to 3 mm. Alternatively, the holder can include either one of the outer-periphery holding portion and opened-end holding portion.

The outer-periphery holding portion and opened-end holding portion can be formed integrally with the water reservoir in advance, or they can be formed independently of the water reservoir and thereafter installed to the water reservoir.

The outer-periphery holding portion can be a cylinder-shaped member which has an inside diameter slightly smaller than the outside diameter of the water-supplying container. Alternatively, the outer-periphery holding portion can be formed as a plurality of plate-shaped members which are disposed at equal intervals in a circumferential direction, and which extend in the longitudinal direction of the water-supplying container.

When the outer-periphery holding portion is formed as a plurality of the plate-shaped members, it is possible to employ water-supplying containers having a variety of sizes. For instance, a first water-supplying container having a predetermined outside diameter is prepared, and a second water-supplying container having an outside diameter larger than the predetermined outside diameter of the first water-supplying container is prepared. If such is the case, the plate-shaped members can be made in advance to have an inside diameter so that they can contact with the outer periphery of the first water-supplying container. Accordingly, when the second water-supplying apparatus is installed to the outer-periphery holding portion in the inverted manner instead of the first water-supplying container, the plate-shaped members are deformed radially outwardly so that they can hold the outer periphery of the second water-supplying container having a large outside diameter.

The opened-end holding portion can be a cylinder-shaped member which is formed integrally with the water reservoir, and which has an opening being communicated with the water held in the water reservoir. Alternatively, the opened-end holding portion can be formed as a plurality of arc-shaped members which are disposed at equal intervals in a circumferential direction. The opening can be a slit or hole which is formed in the peripheral wall of the cylinder-shaped member, or can be a gap which is provided between the bottom end of the cylinder-shaped member and the inner bottom of the water reservoir. Moreover, the opening can be the intervals between the arc-shaped members.

The water distributor includes the water-distributing member, and the cover member.

The water-distributing member has a predetermined length, and distributes water by a capillary action from one of the opposite ends to another thereof. For example, the water-distributing member can be formed of fiber assemblies, ceramic fibers, rock wool or non-woven clothes.

One of the opposite ends of the water-distributing member is disposed in a region where roots of a plant can be supplied with water. The opposite end can be covered with a water-supplying member. The water-supplying member is permeable to water, and includes fine clearances which can inhibit the roots from intruding thereinto.

In particular, when the roots of the plant grow rapidly, the roots may intrude into the water-distributing member, and may be entangled therein to prevent the water-distributing member from distributing water. However, when one of the opposite ends of the water-distributing member is covered with the water-supplying member and is disposed in a region where the rapidly-growing roots of the plant can be supplied with water, it is possible to inhibit the aforementioned drawbacks from happening. Moreover, if such is the case, one of the opposite ends of the water-distributing member can be readily fitted into the cultured earth held in a flowerpot. The water-supplying member can be formed of a porous member. The porous member can be metal nets, non-woven clothes, root-proof sheets or ceramics.

The cover member can be made from materials which are impermeable to water. For instance, the cover can be formed of rubber cylinder-shaped members, resin cylinder-shaped members, or sheets or films impermeable to water. The rubber cylinder-shaped members can be rubber pipes. The sheets or films can be wrapped or wound so that they cover the water-distributing member.

The opposite ends of the extension water-distributing members are immersed in the water reservoirs of the neighboring water-supplying devices which are disposed on an identical plane. The extension water-distributing members operate as follows. As the water held in one of the neighboring water reservoirs is consumed, the extension water-distributing members distribute water from another one of the neighboring water reservoirs to replenish one of the neighboring water reservoirs with the water. Consequently, as far as the inverted water-supplying containers hold water therein, the extension water-distributing members always keep the level of the water held in the water reservoirs at the predetermined water level. Note that the extension water-distributing members can be identical with the water-distributing member.

The present water-supplying apparatus can be applied to watering the roots of plants which are planted in flowerpots, planters, kitchen gardens, or cultivation beds of commercial greenhouses.

First Preferred Embodiment

The First Preferred Embodiment of the present water-supplying apparatus will be hereinafter described with reference to FIGS. 1 through 4.

As illustrated in FIG. 1, the First Preferred Embodiment (i.e., the present water-supplying apparatus 1) comprises a water-supplying device 2, and a water distributor 6.

The water-supplying device 2 includes a water reservoir 3, a water-supplying container 4, and a holder 5.

The water reservoir 3 includes a base member 30, and a concaved member 31. The base member 30 is made from resin, and is disposed at a predetermined position. The concaved member 31 has a flat inner bottom 310, and receives a predetermined amount of water therein. For example, the concaved member 31 holds water in an amount of about 50 c.c. therein, and keeps a predetermined water level "H". The base member 30 is provided with holes 301 which are formed substantially horizontally. The holes 301 are positioned higher than the predetermined water level "H" by about 35 mm. The water distributor 6 is fitted into the holes 301.

The water-supplying container 4 has an opening 40 at one of the opposite ends and a bottom at another one thereof. For instance, the water-supplying container 4 can be a used resin bottle (e.g., a used PET bottle) which has held drinking water therein. The inside 41 of the water-supplying container 4 is filled with water. The water-supplying container 4 is disposed in an inverted manner for service. The water-supplying container 4 can hold water in an amount of about 500 c.c. therein, and has an outside diameter "D" of about 95 mm.

The holder 5 detachably holds the inverted water-supplying container 4 holding water therein. The holder 5 includes an outer-periphery holding portion 50, and an opened-end holding portion 51. The outer-periphery holding portion 50 holds an outer peripheral wall 42 of the inverted water-supplying container 4. The opened-end holding portion 51 holds the opened end 400 of the inverted water-supplying container 4 away from the inner bottom 310 of the water reservoir 3 by an interval "L". The interval "L" can be from 2 to 3 mm.

The outer-periphery holding portion 50 is formed integrally with the base member 30 of the water reservoir 3 to project from the base member 30 as a cylinder shape. The outer-periphery holding portion 50 has an inside diameter "d" which is slightly larger than the outside diameter "D" of the water-supplying container 4. Accordingly, the outer-periphery holding portion 50 detachably holds the outer peripheral wall 42 of the inverted water-supplying container 4.

The opened-end holding portion 51 is formed integrally with the inner bottom 310 of the water reservoir 3 to project upward at the central portion of the concaved member 31 of the water reservoir 3. The opened-end holding portion 51 engages with the opened-end portion 400 of the inverted water-supplying container 4 so as to push up the opened-end portion 400 by the interval "L". Moreover, the opened-end holding portion 51 is provided with an opening 510 which communicates with the concaved member 31.

The water distributor 6 includes a water-distributing member 7, and a cover member 8.

Figure 2:
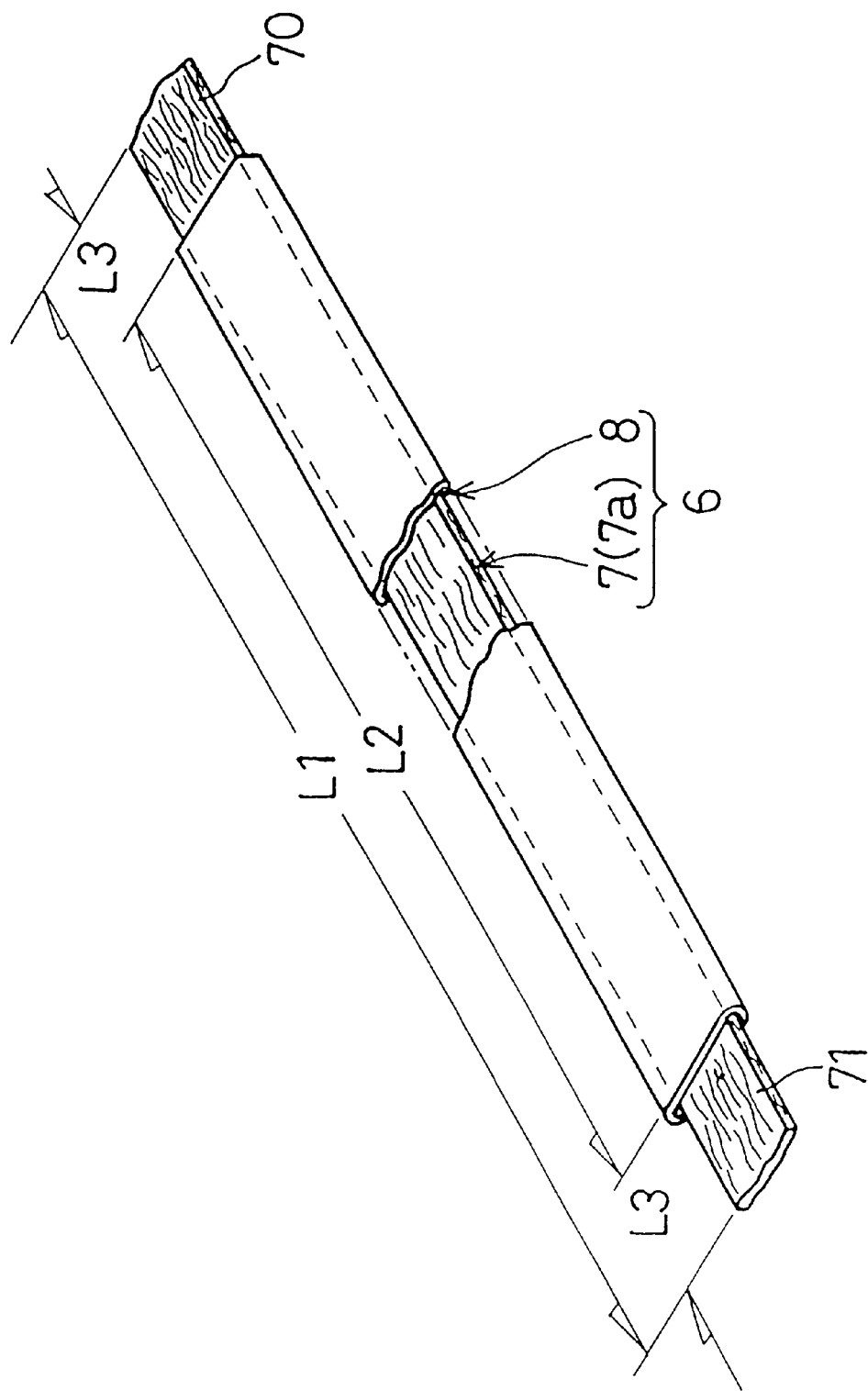
FIG. 2 illustrates a water distributor employed by the First Preferred Embodiment in a perspective view.
Figure 3:
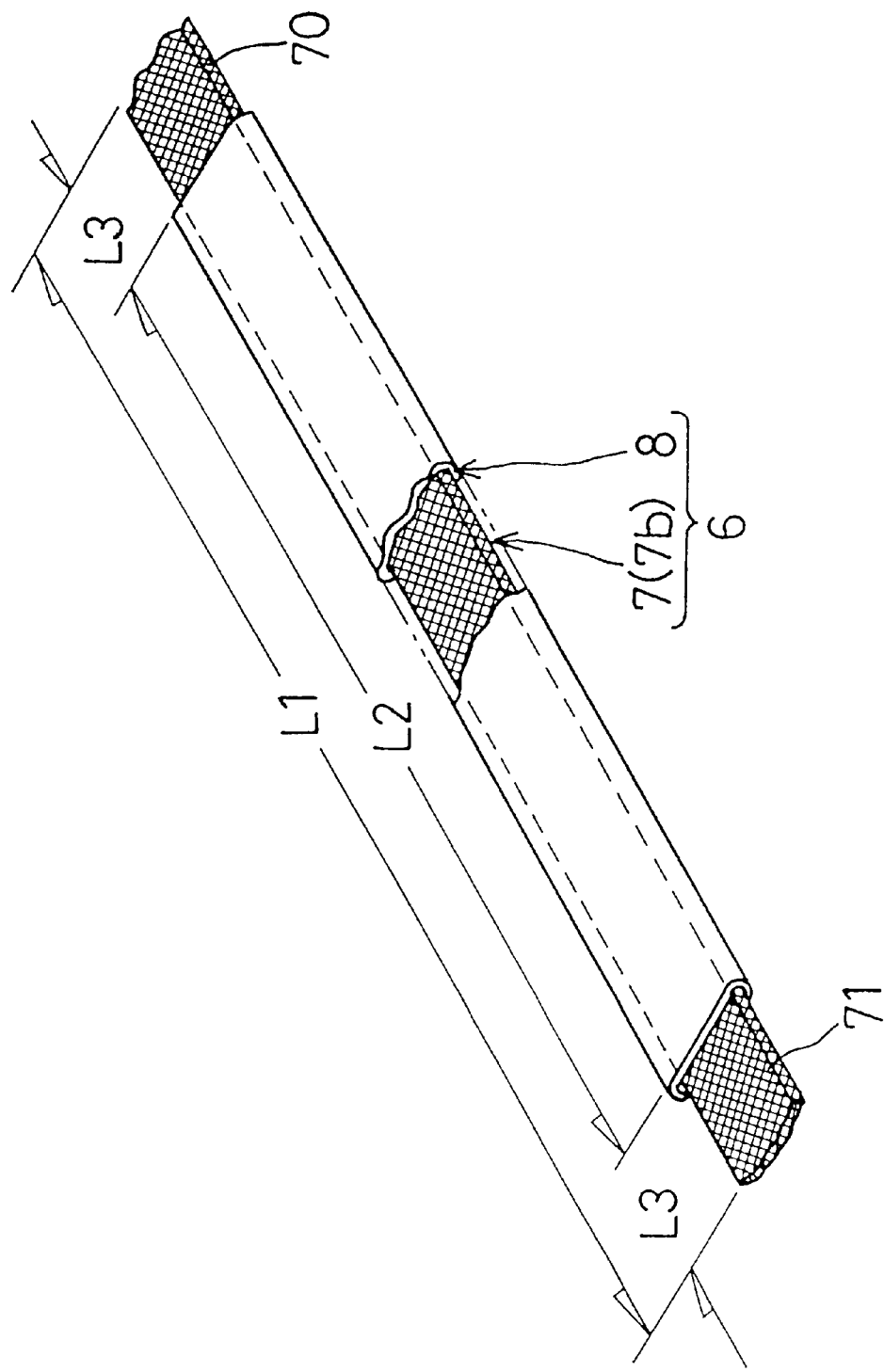
FIG. 3 illustrates another water distributor employed by the First Preferred Embodiment in a perspective view.

For example, as illustrated in FIG. 2, the water-distributing member 7 is formed of a fiber assembly 7a which is made by bundling a plurality of fibers having a predetermined length. Alternatively, as illustrated in FIG. 3, the water-distributing member 7 is formed of a non-woven cloth 7b. Consequently, the water-distributing member 7 distributes water by a capillary action from an opposite end 70 to another opposite end 71.

The cover member 8 is formed as a cylinder-shaped member. The cylinder-shaped member is made from a resin which is impermeable to water. Excepting the opposite end 70 and the other opposite end 71 of the water-distributing member 7, the cover member 8 covers the peripheral portion of the water-distributing member 7, and inhibits water from leaking therefrom.

The thus constructed water distributor 6 is disposed in the following manner: as illustrated in FIG. 1, the opposite end 70 is projected from the cover member 8 so that it is exposed to the outside, and is immersed in the water held in the water reservoir 3 of the water-supplying apparatus 1; and the other opposite end 71 is disposed in a cultured-earth region 92 where roots 91 of a plant 90 can be supplied with water. Note that the plant 90 is planted in a flowerpot 9, and that the flowerpot 9 is placed at a height of "H1" which is above the water level "H" by about 1 to 200 mm. The water level "H" is exhibited by the water which is held in the concaved member 31 of the water reservoir 3.

When the thus constructed present water-supplying apparatus 1 is put in service, the concaved member 31 of the water reservoir 3 of the water-supplying device 2 receives water from the opening 40 of the water-supplying container 4 held invertedly by the holder 5. The amount of the thus supplied water fills the interval "L" between the opened-end portion 400 and the inner bottom 310 of the concaved member 31. Accordingly, the present water supplying apparatus 1 keeps the predetermined water level "H".

Specifically, the water flows out from the opening 40 of the water-supplying container 4 to the concaved member 31 of the water reservoir 3. When the water reaches the predetermined level "H" which fills the interval "L", the air is inhibited from going into the inside 41 of the water-supplying container 4 from the opened-end 400 via the opening 40. Consequently, the water stops flowing out.

Thus, the water is held in the concaved member 31 of the water reservoir 3, and exhibits the predetermined water level "H". Then, the water moves in the water-distributing member 7 of the water distributor 6 from the opposite end 70 to the other opposite end 71 by the capillary action. In the meantime, the water is inhibited from leaking and evaporating by the cover member 8. Consequently, the water is distributed to the cultured-earth region 92. Note that the cultured-earth region 92 is placed at the upper position "H1" which is above the predetermined water level "H" by about 1 to 200 mm.

As a result, the water is distributed from the other opposite end 70 of the water-distributing member 7 to the cultured-earth region 92 in accordance with the humidity, dryness or temperature of the atmosphere. Therefore, the cultured-earth region 92 can always contain water in an amount which is required by the roots 91 of the plant 90. Then, the roots of the plant 90 absorb the water involved in the cultured-earth region 92 as required. As the water held in the concaved member 31 is distributed to the cultured-earth region 92 of the flowerpot 9 through the water-distributing member 7, and is consumed by the plant 90, the water held in the concaved member 31 exhibits a consumed water level "H2" which is below the predetermined water level "H". At this time, the air is introduced into the inside 41 of the water-supplying container 4 from the opened-end 400 via the opening 40. Then, the water held in the water-supplying container 4 flows out into the concaved member 31 in an amount corresponding to the air introduction. When the water held in the concaved member 31 recovers the predetermined water level "H", the water again stops flowing out. These operations are carried out repeatedly.

In the present water-supplying apparatus 1, once the concaved member 31 of the water reservoir 3 is replenished with water through the opening 40 of the water-supplying container 4 which is held invertedly by the holder 5, the predetermined level "H" can be kept at the initial point of service for a long period of time even after the water reservoir 3 is left alone. In addition, the water held in the inverted water-supplying container 4 can be stably supplied to the cultured-earth region 92 of the flowerpot 9, which is positioned above the predetermined level "H", for a long period of time. For example, when the flowerpot 9 had a nominal size of about 140 mm, the present water-supplying apparatus 1 could replenish water to the roots 91 of the plant 9 without shortage or overflow for about 15 to 30 days, a quite long period of time.

When all of the water held in the inside 41 of the water-supplying container 4 is consumed, it is possible to replace the water-supplying container 4 with a new water-supplying container 4 whose inside 41 is filled with water. Alternatively, after the empty water-supplying container 4 can be replenished with water, it can be set invertedly in the water reservoir 3 again. Thus, the plant 90 can be kept being supplied with water naturally.

The following is one of the major features of the present water-supplying apparatus 1: the holder 5 detachably holds the water-supplying container 4 invertedly so as to dispose the opening 40 in the water held in the water reservoir 3; and the inverted water-supplying container 4 provides the interval "L" between the inner bottom 310 and the opening 40 of the inverted water-supplying apparatus 4. The interval "L" can preferably be in the range of from 2 to 3 mm. With these novel arrangements, the water-supplying device 2 can receive water to the predetermined water level "H" therein; and the predetermined water level "H" can be always positioned below the cultured-earth region 92 of the flowerpot 9.

Keeping the predetermined water level "H" always below the cultured-earth region 92 of the flowerpot 9 means that the water held in the water reservoir 3 at the predetermined water level "H" can be distributed to the roots 91 of the plant 90, which is present above the predetermined water level "H", in an amount required only of the plant 9 by utilizing the capillary action of the water-distributing member 7. Moreover, the water absorbed in the cultured-earth region 92 can be controlled naturally so that the water content is less than the saturated content.

In other words, as the content of the water absorbed by the cultured-region 92 approaches the saturated content, the water distribution decreases naturally. Accordingly, it is possible to inhibit the water from distributing before the water distribution is more than the saturated content. Moreover, when the water distribution exceeds the saturated content, the water leaks from the flowerpot 9 to the outside by the excessive water distribution. However, it is possible to cancel the water leakage.

The predetermined water level "H" is thus set below the bottom of the flowerpot 9. Consequently, it is possible to adequately control the amount of the water to be distributed to the places which are present higher than the predetermined water level "H" by utilizing the capillary action of the water-distributing member 7 effectively.

Although the cultured-earth region 92 is positioned above the predetermined water level "H", it is kept involving the water by its own capillary action after the water is distributed to the cultured-earth region 92 by the capillary action of the water-distributing member 7. Thus, the water is distributed to the cultured-earth region 92 from the water reservoir 3 in which predetermined water level "H" is kept down below the cultured-earth region 92. Consequently, when the cultured-earth region 92 is saturated with the water, the water distribution can be controlled naturally to inhibit the water from being distributed in an excessive amount. As a result, once the water is distributed to the cultured-earth region 92, the water little leaks to the outside of the flowerpot 9. Thus, the present water-supplying apparatus 1 does not wet the floor or make it dirty by leaking the water from the flowerpot 9 to the outside.

Note that, in the conventional water-supplying apparatus, the predetermined water level "H" is not positioned below the cultured-earth region 92 of the flowerpot 9. The conventional water-supplying apparatus can supply the water held in the water source to the flowerpot 9 by utilizing the capillary action. However, even after the cultured-earth region 92 of the flowerpot 9 is saturated by distributing the water, the water is kept being distributed to the flowerpot 9 until it is run out completely. Consequently, there arises the problem which results from the water leaking to the outside of the flowerpot 9.

The present water-supplying apparatus 1 distributes water to the flowerpot 9. The amount of the water absorbed by the cultured-earth region 92 can be adjusted to desired values up to the maximum value (i.e., the saturated content (or 100%) of the water absorbed by the cultured-earth region 92) by preliminarliy setting the height difference between the predetermined water level "H" and the upper position "H1" to various values.

For instance, the height difference between the predetermined water level "H" and the upper position "H" can be related to the water content absorbed by the cultured-earth region 92 as follows. When the height difference falls in the range of from 1 to 60 mm, the water content is the saturated content (100%) approximately. When the height difference falls in the range of from 70 to 120 mm, the water content is 50% of the saturated content approximately. When the height difference falls in the range of from 120 to 200 mm, the water content fills in the range of from 5 to 6% of the saturated content approximately. When the height difference is 210 mm or more, the water content is 4% or less of the saturated content approximately.

Therefore, when the height difference is set so as to fall in the range of from 70 to 120 mm, the water content absorbed by the cultured-earth region 92 can be kept at 50% of the saturated content virtually, and the water is distributed continuously until about 500 c.c. of the water held in the water-supplying container 4 is consumed completely. As a result, there occurs no problems which result from the water leaking to the outside of the flowerpot 9.

Figure 4:
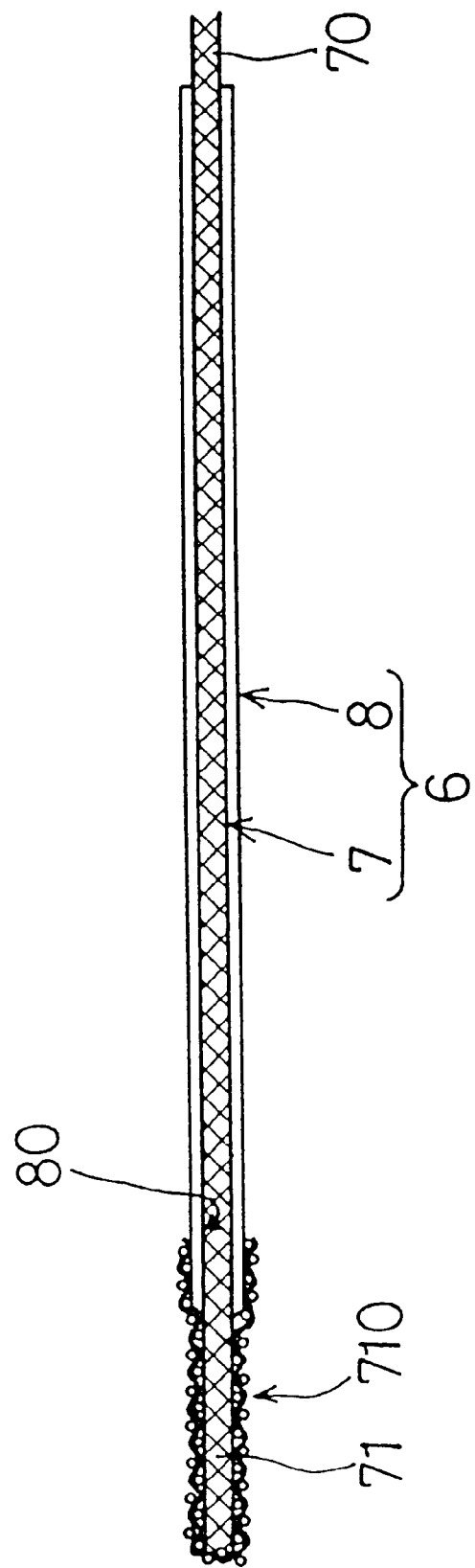
FIG. 4 illustrates how to use a water distributor employed by the First Preferred Embodiment in a cross-sectional view.

If necessary, the other opposite end 71 of the water-distributing member 7 can be covered with a metal net 710 in advance as illustrated in FIG. 4. The metal net 710 has fine clearances which are permeable to water, and which can inhibit the roots 91 of the plant 90 from intruding. For example, the metal net 710 exhibits a mesh size of 38 or less. If such is the case, even when the roots 91 of the plant 90 grow, the metal net 710 inhibits the roots 91 from intruding into the inside 80, which is covered with the cover member 8, from the opposite end 71 of the water-distributing member 7. Accordingly, the roots 91 hardly entangle with the water-distributing member 7 to cause the problems which result from the disabled water distribution. Moreover, when the opposite end 71 of the water-distributing member 7 is disposed in the region where the roots 91 of the plants 90 can be supplied with water, the opposite end 71 can be readily fitted into the cultured-earth region 92 held in the flowerpot 9.

Modified Version of the First Preferred Embodiment

Figure 5:
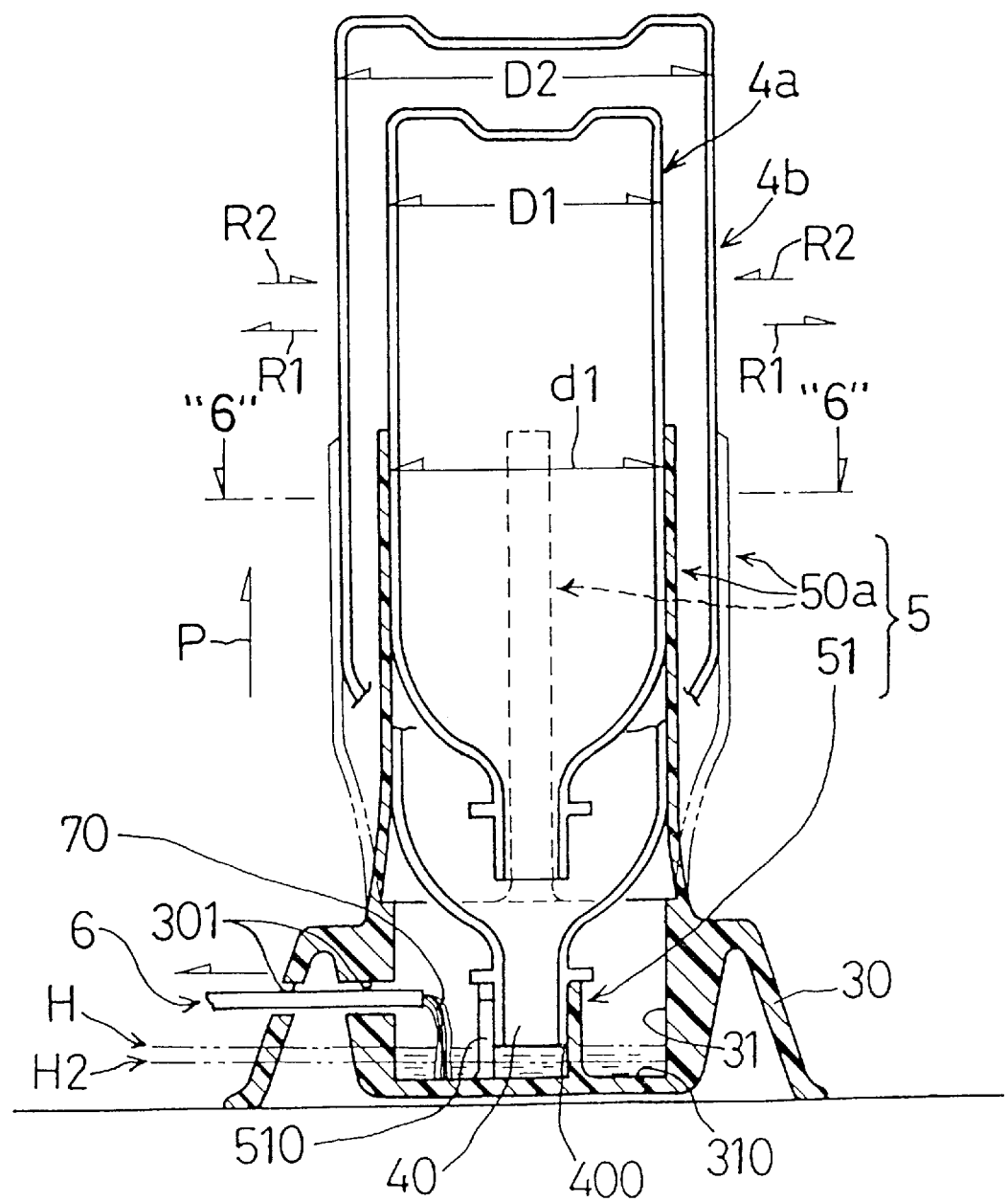
FIG. 5 illustrates a modified version of a holder employed by the First Preferred Embodiment in a cross-sectional view.
Figure 6:
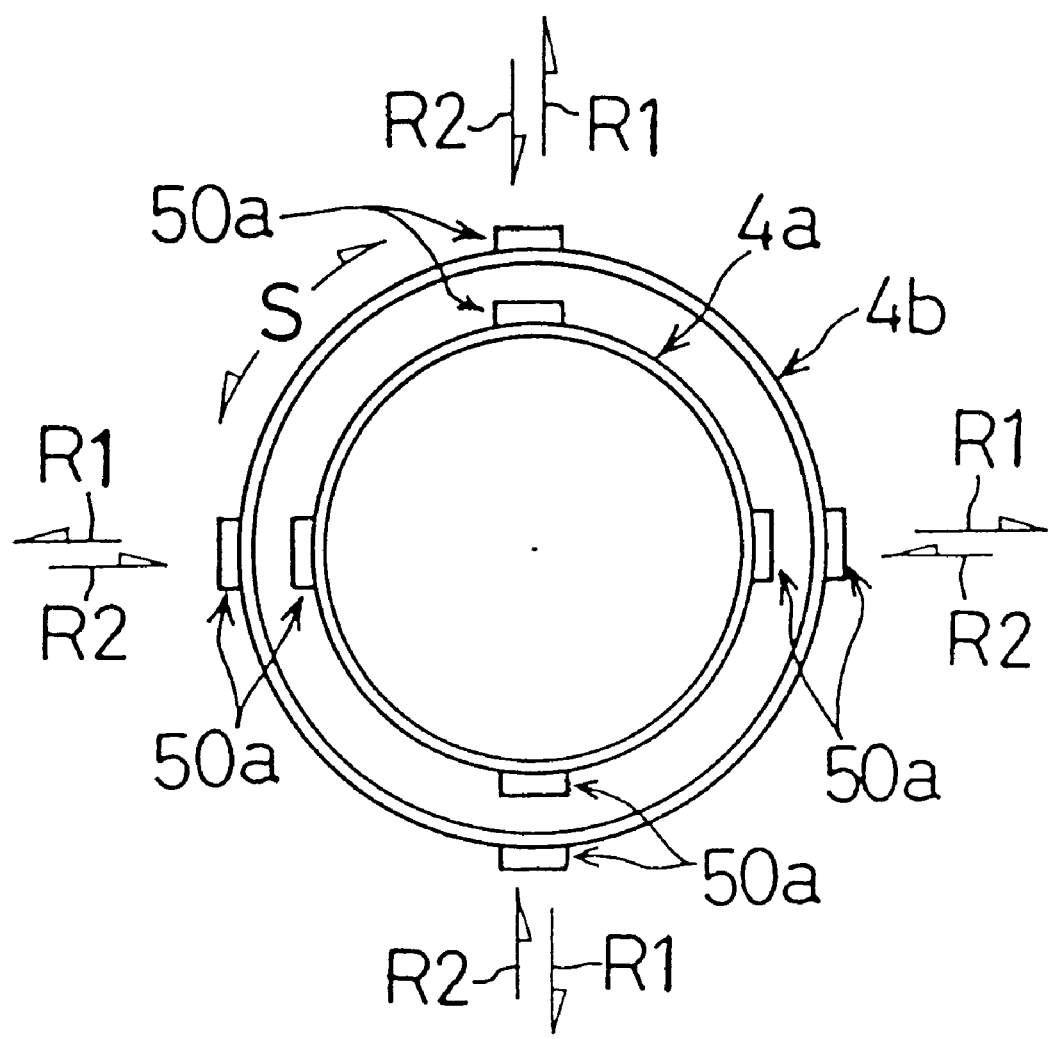
FIG. 6 is a cross-sectional view taken in the direction of the arrows "6"—"6" of FIG. 5.

FIGS. 5 and 6 illustrate a modified version of the First Preferred Embodiment in which the outer-periphery holding portion 50 of the holder 5 of the present water-supplying apparatus 1 is modified. In the modified version, an outer-periphery holding portion 50a enables the holder 5 to detachably hold a plurality of water-supplying containers 4a and 4b having different sizes.

The outer-periphery holding portion 50a is formed integrally with the base member 30 of the water reservoir 3. For instance, the outer-periphery holding portion 50a enables the holder 5 to detachably hold the water-supplying container 4a whose outside diameter "D1" is 95 mm, and the water-supplying container 4b whose outside diameter "D2" is 100 mm. As illustrated in FIG. 6, in order to carry out the object, the outer-periphery holding portion 50a includes a plurality of plate-shaped members whose inside diameter "d1" is 95 mm. Note that the inside diameter "d1" is a dimension when none of the water-supplying containers 4a and 4b are installed to the holder 5. As illustrated in FIG. 6, the plate-shaped members are disposed at equal intervals in the circumferential direction "S". As illustrated in FIG. 5, the plate-shaped members extend in the longitudinal direction "P" of the water-supplying containers 4a and 4b.

The size of the water-supplying container 4a is smaller than that of the water-supplying container 4b. When the smaller water-supplying container 4a is installed to the holder 5, the outer-periphery holding portion 50a is slightly deformed elastically in the radial direction "R1" outwardly, thereby producing an elastic repulsion force (or an urging force acting in the direction of "R2" inwardly). Accordingly, the holder 5 can fasten and hold the smaller water-supplying container 4a by the elastic repulsion force.

On the other hand, the water-supplying container 4b is larger than the water-supplying container 4a. When the larger water-supplying container 4b is installed to the holder 5, the outer-periphery holding portion 50a is deformed elastically in the radial direction "R1" outwardly and more greatly than it is deformed in the above-described operation, thereby producing a larger elastic repulsion force. Accordingly, the holder 5 can fasten and hold the larger water-supplying container 4a by the larger elastic repulsion force.

As a result, with the outer-periphery holding portion 50a of the modified version, it is possible to further use water-supplying containers of various sizes (not shown) in addition to the two water-supplying containers 4a and 4b of different outside diameters.

Second Preferred Embodiment

The Second Preferred Embodiment (i.e., the present water-supplying apparatus 1A) will be hereinafter described with reference to FIGS. 7 and 8.

Figure 7:
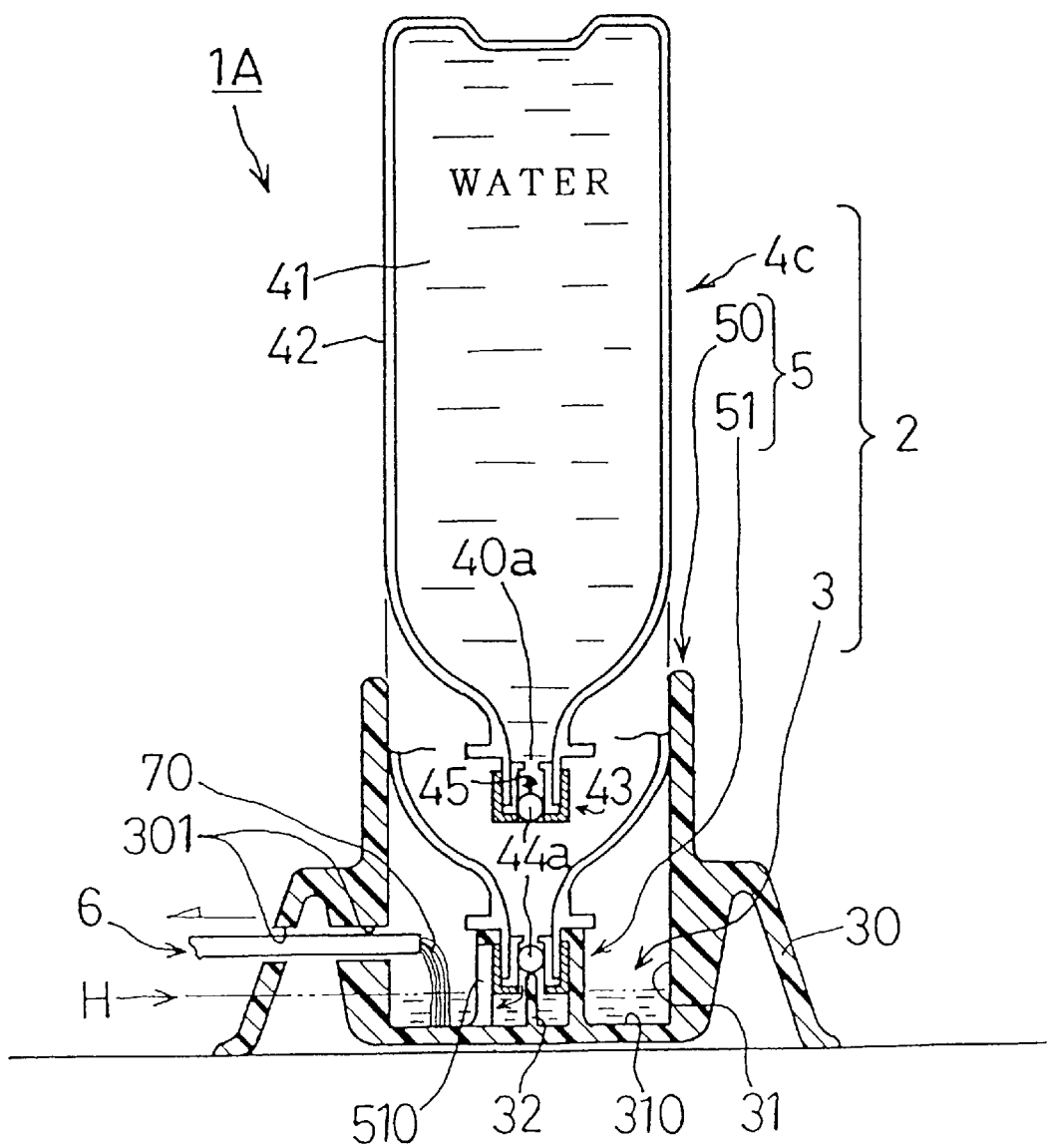
FIG. 7 is a cross-sectional view of a Second Preferred Embodiment of the present water-supplying apparatus, and illustrates the relationship between a riser, which is formed in a water reservoir thereof, and a ball-shaped check valve, which is formed in an opening of a water-supplying container thereof.

As illustrated in FIG. 7, except that the present water-supplying apparatus 1A is provided with a ball-shaped check valve 44a and a riser 32, it has the same arrangements as those of the First Preferred Embodiment. The ball-shaped check valve 44a is disposed in the opening 40a of the water-supplying container 4c so that it closes the opening 40a by a hydraulic pressure which is exerted when the water-supplying container 4c is transferred in the inverted manner. The ball-shaped check valve 44a thus inhibits the water held in the water-supplying container 4c from leaking to the outside via the opening 40a. The riser 32 pushes up the ball-shaped check valve 44a to open the opening 40a when the water-supplying container 4c is held invertedly in the water reservoir 3.

The riser 32 is formed as a rod-shaped member, and is erected from the inner bottom 310 of the water reservoir 3. As later described, a hole 431 is formed in a lid 43. The riser 32 has such a thickness that it can provide an interval between itself and the hole 431 to freely supply the water held in the inside 41 of the water-supplying container 4c to the water reservoir 3 when it is fitted into the hole 431.

Figure 8:
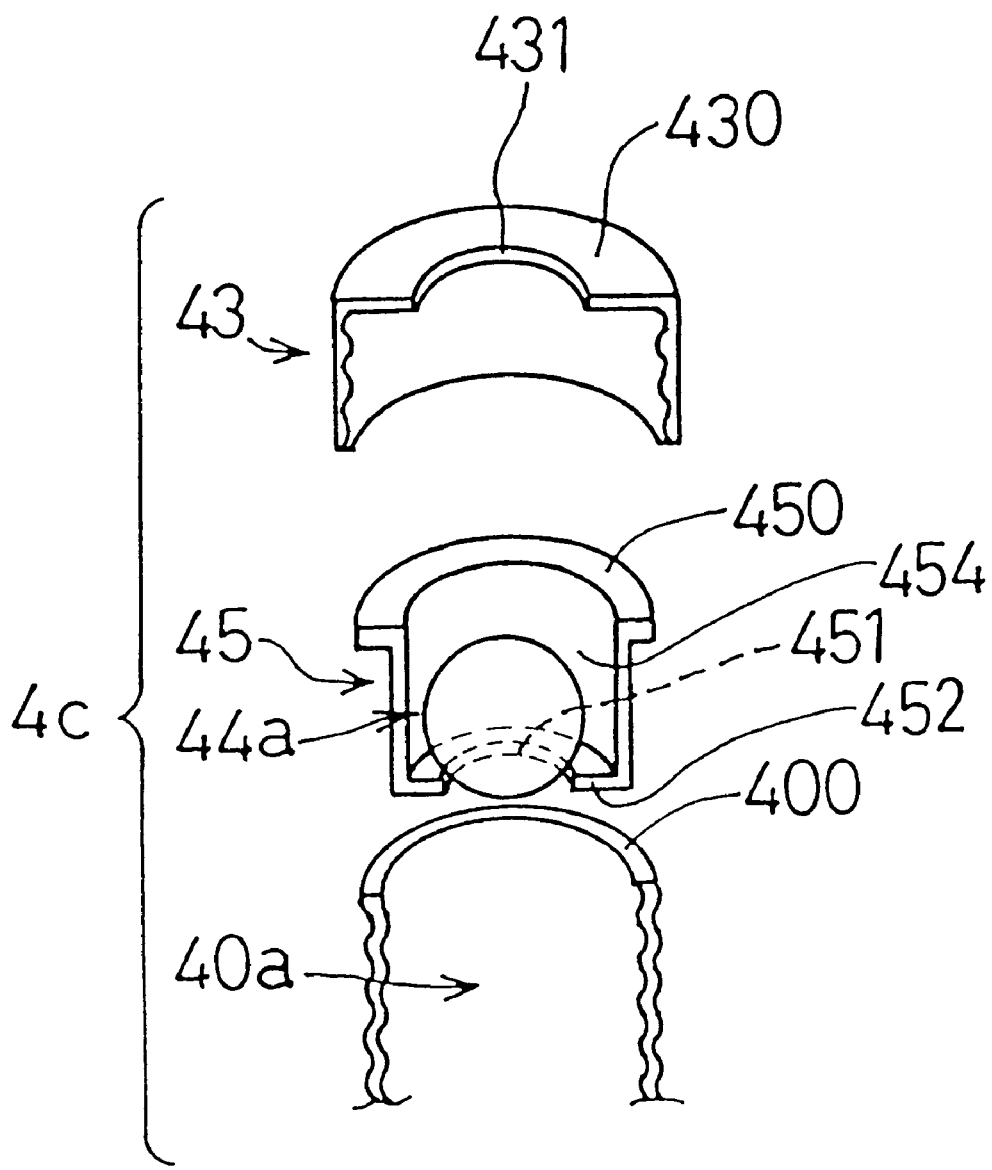
FIG. 8 is an enlarged cut-out exploded view of the ball-shaped check valve employed by the Second Preferred Embodiment.

As illustrated in FIG. 8, the ball-shaped check valve 44a is accommodated movably between the lid 43 and a receptacle 45. The lid 43 is detachably installed to the opening 40a of the water-supplying container 4c. The receptacle 45 is disposed between the lid 43 and the opening 40a.

The lid 43 is provided with the hole 431 in the central portion of the top 430. The hole 431 is opened and closed by the ball-shaped check valve 44a.

The receptacle 45 is formed as a concaved and bottomed cylinder-shaped member. The receptacle 45 includes a flange 450, and a bottom 452, and a receiving chamber 454. The flange 450 is disposed at the top end. The bottom 452 is provided with a hole 451 therein. The receiving chamber 454 is disposed between the flange 450 and the bottom 452.

The present water-supplying apparatus 1A operates as follows. After the inside 41 of the water-supplying container 4c is filled with water, the lid 43 is installed to the opening 40a. Note that the receptacle 45 receives the ball-shaped check valve 44a therein, and that it is further disposed between the lid 43 and the opening 40a. At this moment, the flange 450 of the receptacle 45 is placed on the opened-end 400 of the water-supplying container 4c, and is held between the top 430 of the lid 43 and the opened-end 400.

Thereafter, the water-supplying container 4c is disposed invertedly in the water reservoir 3 as illustrated in FIG. 7. When the water-supplying container 4c is transferred in the inverted manner, the ball-shaped check valve 44a is seated in the hole 431 of the lid 43 by the hydraulic pressure to close the opening 40a.

Thus, except for the concaved member 31 of the water reservoir 3, the water held in the water-supplying container 4c little leaks while the water-supplying container 4c is replenished with water and is held invertedly in the water reservoir 3 by the holder 5. In addition, all of the water held in the water-supplying container 4c can be utilized to keep the water held the in the concaved member 31 of the water reservoir 3 at the predetermined water level "H".

The present water-supplying apparatus 1A operates and produces advantages in the same manner as the First Preferred Embodiment. Moreover, in the present water-supplying apparatus 1A, the ball-shaped check valve 44a is not pushed up by the riser 32 of the water reservoir 3 until the water-supplying apparatus 4c is held invertedly in the water reservoir 3 by the holder 5. Thereafter, the ball-shaped check valve 44a is separated from the hole 431 of the lid 43 against the hydraulic pressure which is exerted by the water held in the water-supplying container 4c. Then, the opening 40a of the water-supplying container 4c is opened forcibly. Finally, the water held in the water-supplying container 4c is supplied to the concaved member 31 of the water reservoir 3. Thus, the water held in the water reservoir 3 can be kept at the predetermined water level "H". As a result, the present water-supplying apparatus 1A can utilize the water held in the water-supplying container 4c without loss.

Third Preferred Embodiment

The Third Preferred Embodiment (i.e., the present water-supplying apparatus 1B) will be hereinafter described with reference to FIGS. 9 and 10.

Figure 9:
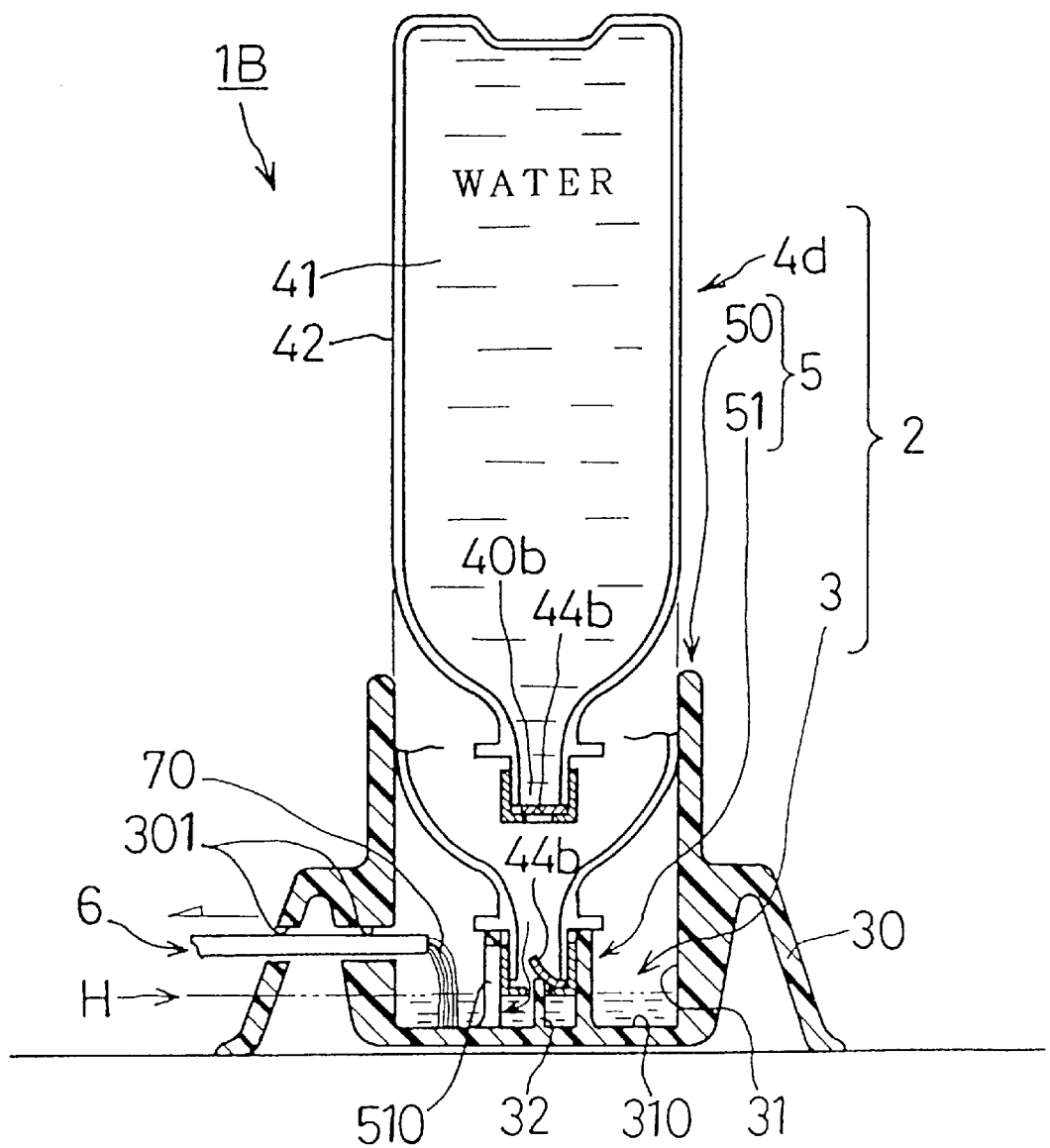
FIG. 9 is a cross-sectional view of a Third Preferred Embodiment of the present water-supplying apparatus, and illustrates the relationship between a riser, which is formed in a water reservoir thereof, and a tongue-shaped check valve, which is formed in an opening of a water-supplying container thereof.

As illustrated in FIG. 9, instead of the ball-shaped check valve 44a employed in the Second Preferred Embodiment, the present water-supplying apparatus 1B employs a tongue-shaped check valve 44b. When the water-supplying container 4d holding water therein is transferred invertedly, the tongue-shaped check valve 44d closes the opening 40b of the water-supplying container 4d by a hydraulic pressure, and inhibits the water held in the water-supplying container 4d from leaking to the outside via the opening 40b. Except for the tongue-shaped check valve 44b, the present water-supplying apparatus 1B has the same arrangements as those of the Second Preferred Embodiment.

Figure 10:
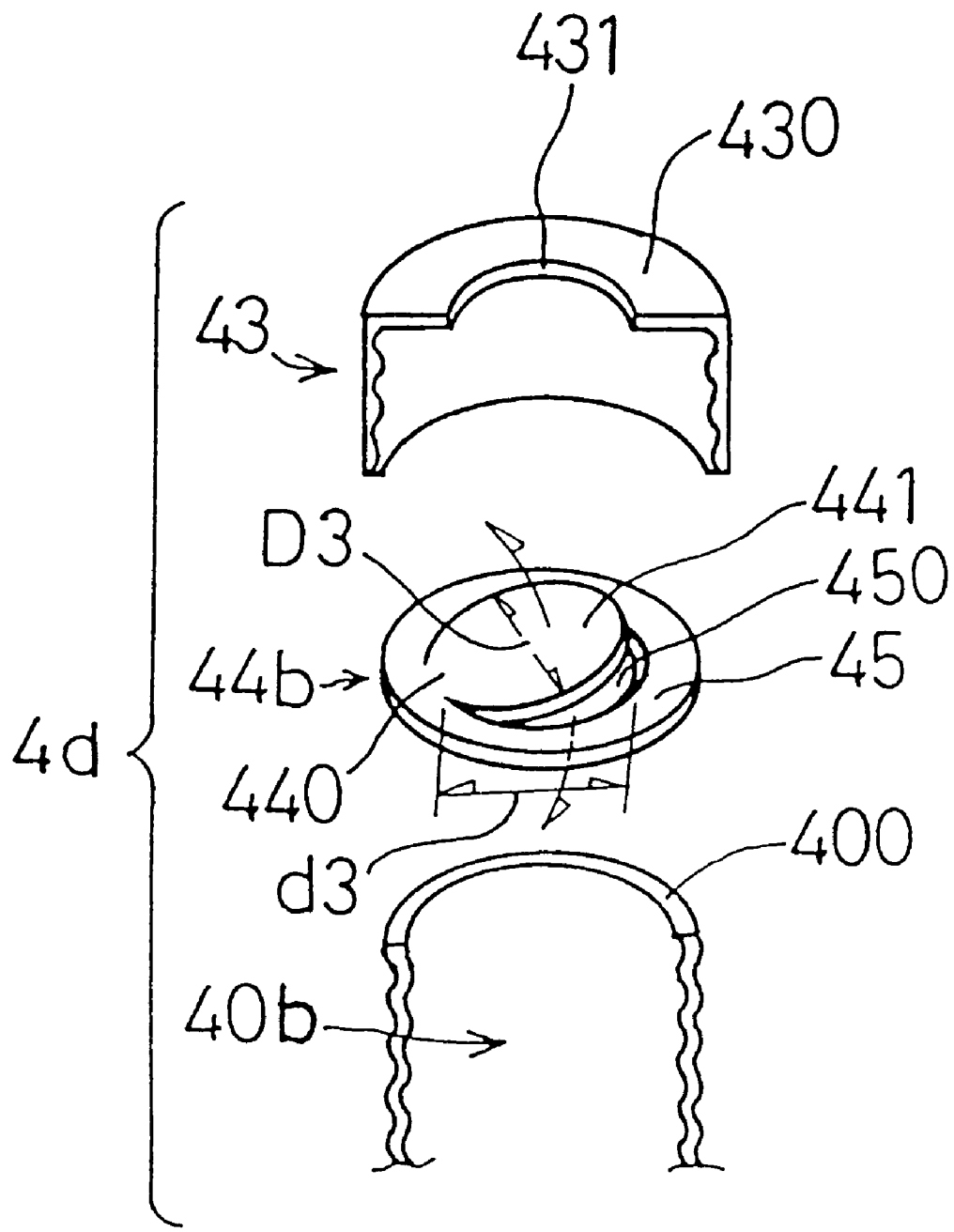
FIG. 10 is an enlarged cut-out exploded view of the tongue-shaped check valve employed by the Third Preferred Embodiment.

As illustrated in FIG. 10, the lid 43 is detachably installed to the opening 40a of the water-supplying container 4d. The tongue-shaped check valve 44b is housed in the lid 43, and is held between the lid 43 and the opening 40b.

The lid 43 is provided with the hole 431 in the central portion of the top 430.

The hole 431 is opened and closed by a tongue 44 of the tongue-shaped check valve 44b.

Specifically, as illustrated in FIG. 10, the tongue-shaped check valve 44b includes a ring-shaped base 45, a connector 440, and the tongue 441. The base 45 has an opening 450 having an inside diameter "d3", and is placed on the opened-end 400. The connector 440 is connected with the base 45. The tongue 441 is formed as a disk virtually, and has an inside diameter "D3" which is smaller than the inside diameter "d3" of the opening 450 formed in the base 45. Accordingly, the tongue 441 can swing up and down in the opening 450 about the connector 440 working as a fulcrum.

The present water-supplying apparatus 1B operates as follows. After the inside 41 of the water-supplying container 4d is filled with water, the tongue-shaped check valve 44b is held between the top 430 of the lid 43 and the opened-end 400 of the water-supplying container 4d so that the ring-shaped base 45 is placed over the opened-end 400.

Thereafter, the water-supplying container 4d is disposed invertedly in the water reservoir 3 as illustrated in FIG. 9. When the water-supplying container 4d is transferred in the inverted manner, the tongue-shaped check valve 44b is seated in the hole 431 of the lid 43 by the hydraulic pressure to close the opening 40b.

Thus, except for the concaved member 31 of the water reservoir 3, the water held in the water-supplying container 4d little leaks while the water-supplying container 4d is replenished with water and is held invertedly in the water reservoir 3 by the holder 5. In addition, all of the water held in the inside 41 of the water-supplying container 4d can be utilized to keep the water held in the concaved member 31 of the water reservoir 3 at the predetermined water level "H".

The present water-supplying apparatus 1B operates and produces advantages in the same manner as the First Preferred Embodiment. Moreover, in the present water-supplying apparatus 1B, the tongue 441 of the tongue-shaped check valve 44b is not pushed up by the riser 32 of the water reservoir 3 until the water-supplying apparatus 4d is held invertedly in the water reservoir 3 by the holder 5. Thereafter, the tongue 441 swings about the connector 440 which is connected with the ring-shaped base 45 to work as the fulcrum. Consequently, the tongue 441 is separated from the hole 431 of the lid 43 against the hydraulic pressure which is exerted by the water held in the water-supplying container 4d. Then, the opening 40b of the water-supplying container 4d is opened forcibly. Finally, the water held in the water-supplying container 4d is supplied to the concaved member 31 of the water reservoir 3. Thus, the water held in the water reservoir 3 can be kept at the predetermined water level "H". As a result, the present water-supplying apparatus 1B can utilize the water held in the water-supplying container 4d without loss.

Fourth Preferred Embodiment

Figure 15:
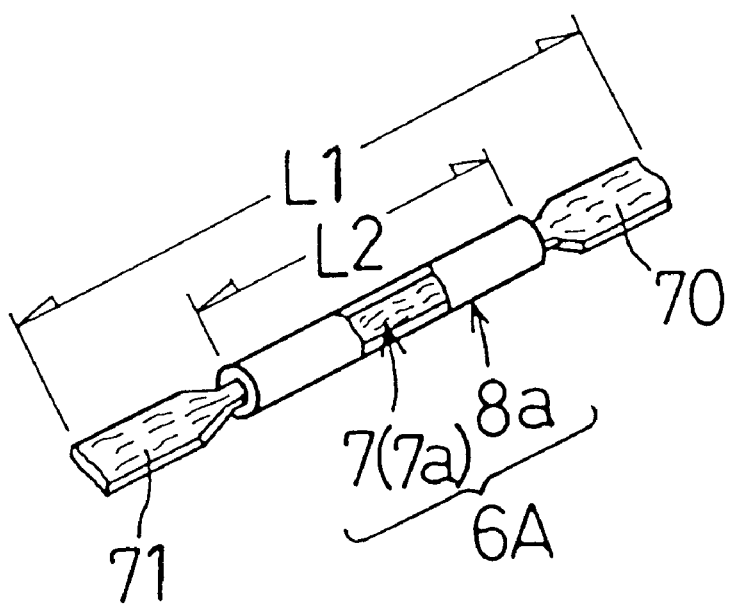
FIG. 15 illustrates another extension water distributor employed by the Fourth Preferred Embodiment in a perspective view.

The Fourth Preferred Embodiment (i.e., the present water-supplying apparatus 1C) will be hereinafter described with reference to FIGS. 11 and 15.

Figure 11:
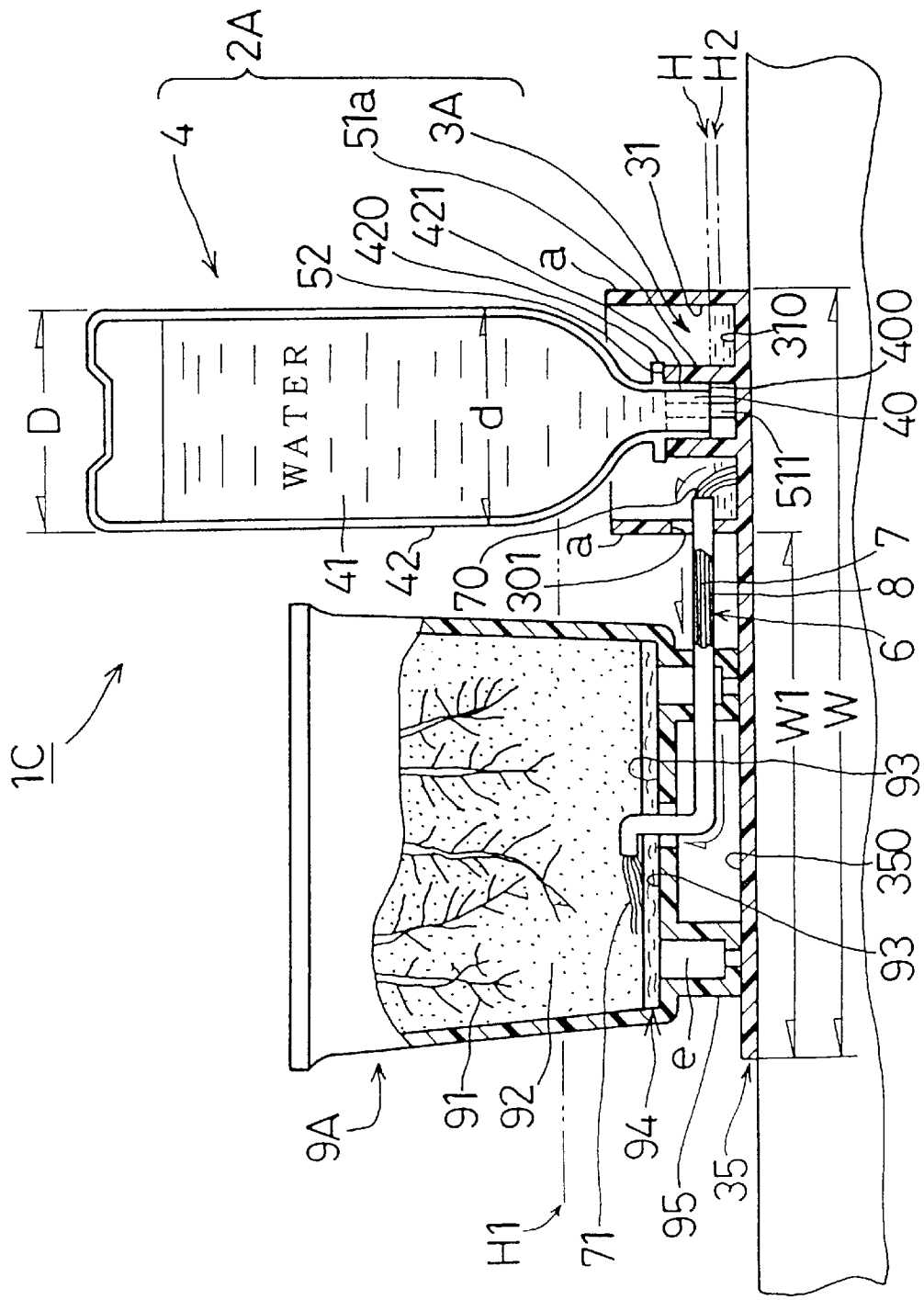
FIG. 11 is a partial cross-sectional and perspective view of a Fourth Preferred Embodiment of the present water-supplying apparatus, and roughly illustrates how to use it.
Figure 12:
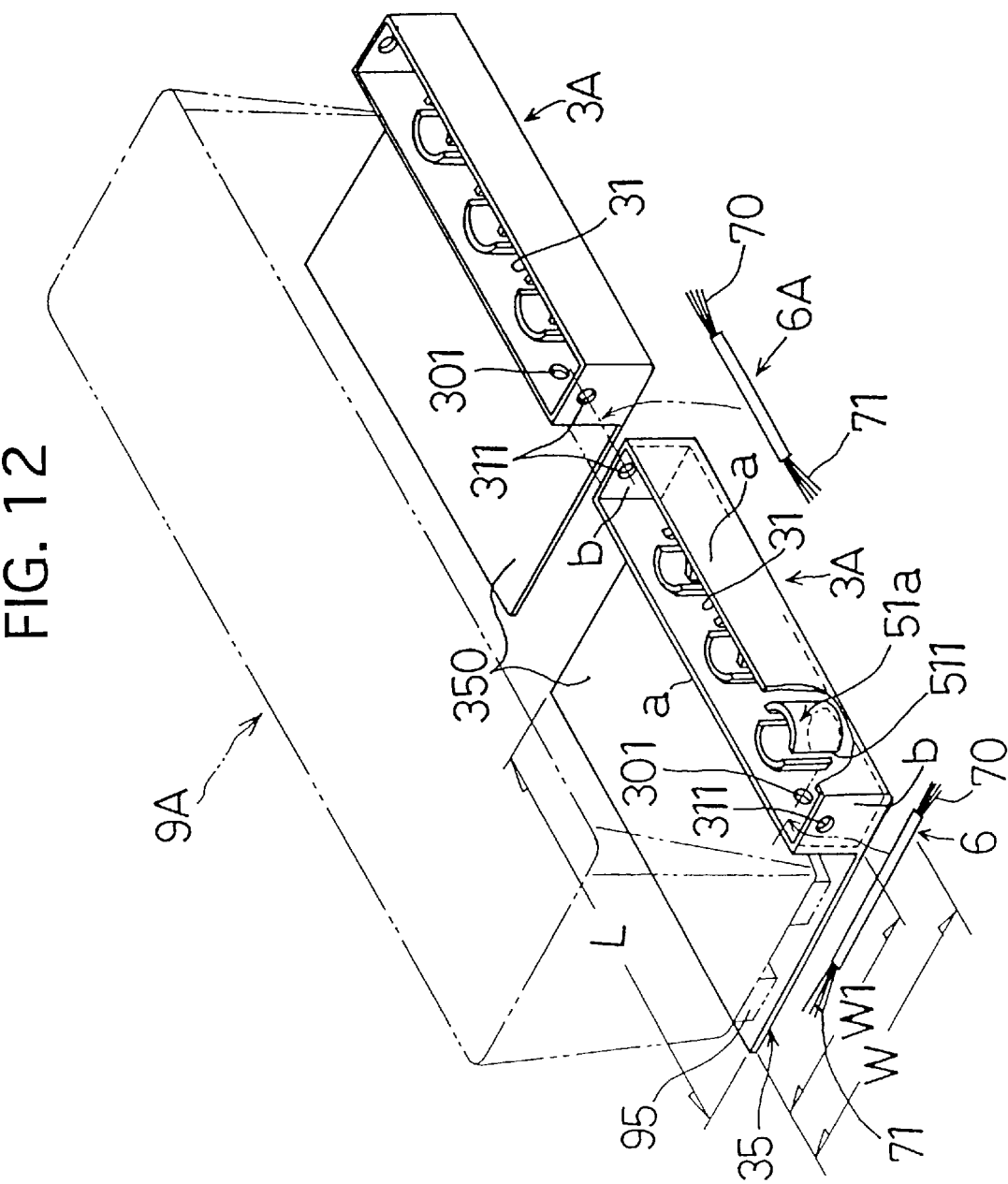
FIG. 12 is a perspective view for illustrating how two water-supplying devices are disposed in the Fourth Preferred Embodiment.
Figure 13:
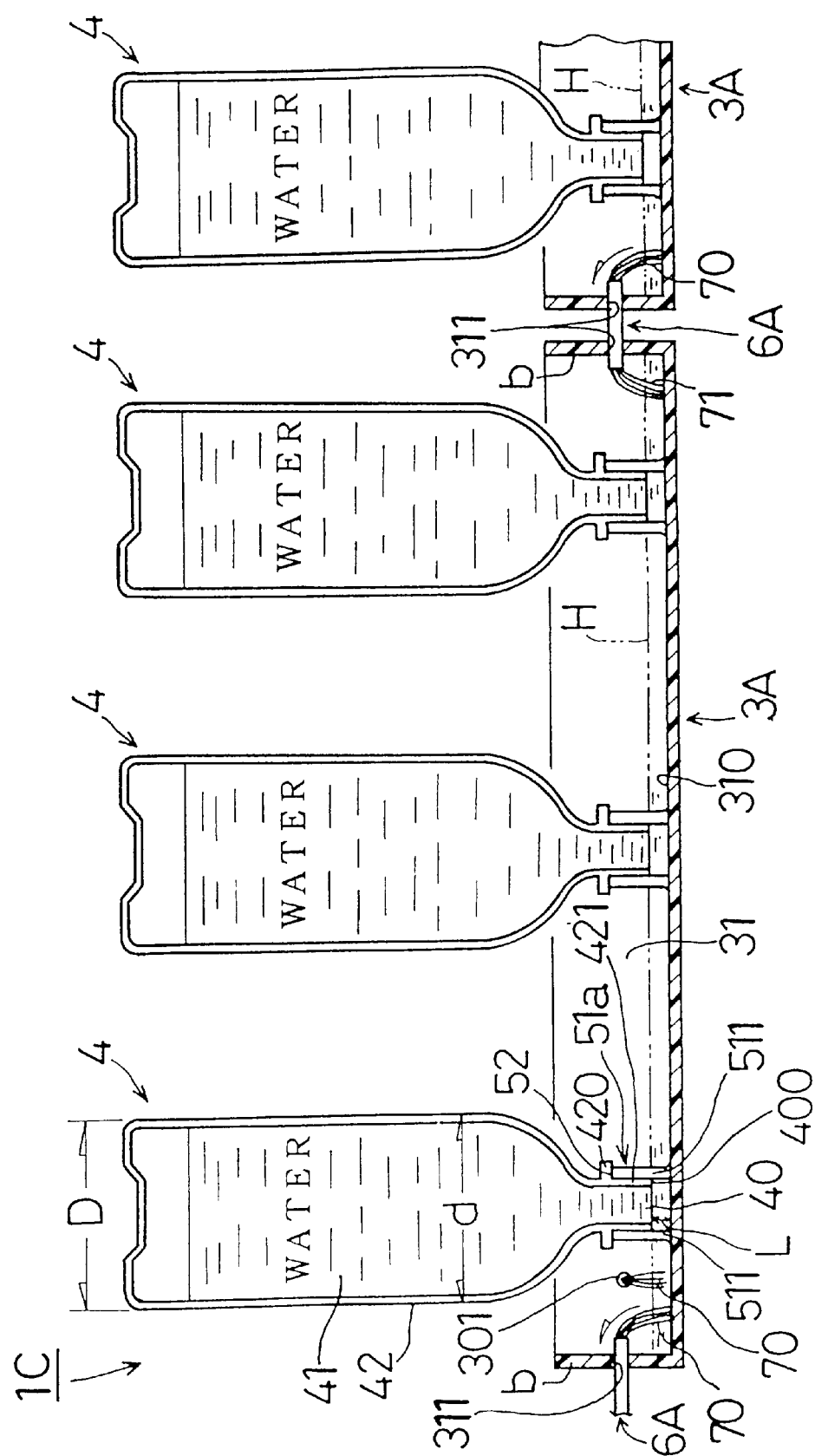
FIG. 13 is a cross-sectional view for illustrating how two water-supplying devices are disposed in the Fourth Preferred Embodiment, and how water-supplying containers are held in an inverted manner by opened-end holding portions, which are formed in water reservoirs, therein.

FIG. 11 generally illustrates the present water-supplying apparatus 1C. Except that the present water-supplying apparatus IC employs a different water-supplying device 2A, it has the same arrangements as those of the First Preferred Embodiment. The water-supplying device 2A includes a water reservoir 3A made from resin, and a table 35. As illustrated in FIGS. 12 and 13, the water reservoir 3A is provided with a plurality of opened-end holding portions 51a which detachably hold the reduced-diameter portion 421 of the inverted water-supplying containers 4. The table 35 is formed integrally with the water reservoir 3A, and can place the flowerpot 9 (shown in FIG. 1) or a planter 9A (shown in FIGS. 11 and 12) thereon.

As illustrated in FIG. 12, the water-reservoir 3A includes the concaved member 31 formed as a rectangle, and three of the opened-end holding portions 51a.

The concaved member 31 includes the bottom surface 310, two long-side walls "a", "a", and two short-side walls "b", "b". The long-side walls "a", "a" erect from two sides of the bottom surface 310. The short-side walls "b", "b" erect from another two sides of the bottom surface 310. One of the long-side walls "a", "a" is provided with a hole 301 into which the water distributor 6 is fitted to distribute water to the flowerpot 9 or planter 9A. Note that the hole 301 is formed about 35 mm above the predetermined water level "H". The short-side walls "b", "b" are provided with a hole 311 into which an extension water distributor 6A is fitted. Note that the hole 311 is formed about 35 mm above the predetermined water level "H".

The opened-end holding portion 51a is formed as a cylinder which erects from the flat inner bottom 310 of the concaved member 31 of the water reservoir 3A. Moreover, the opened-end holding portion 51a has two slits 511 formed in the periphery. The three of the opened-end holding portions 51a are disposed at predetermined intervals in the longitudinal direction of the concaved member 31.

The table 35 is formed as a plate having a predetermined thickness. The table 35 extends horizontally from the bottom end of one of the long-side walls "a", "a" which constitutes the concaved member 31. Accordingly, the width "W" involving the water reservoir 3A, and the width "W1" extending from the long-side wall "a" can be adjusted freely for all purposes. Thus, the table 35 has an area which can place the legs 95 of the planter 9A thereon.

As illustrated in FIG. 11, a stopper plate 94 is disposed on the inner bottom 93 of the planter 9A so as to inhibit the cultured earth 92 from coming into the space "e" formed in the leg 95. If necessary, instead of the metal net 710 (shown in FIG. 4) employed by the First Preferred Embodiment, the other end 71 of the water-distributing member 7 can be covered with a commercially available root-proof sheet (not shown) in advance.

In the water-supplying apparatus 1, the water-supplying devices 2A can hold the three water-supplying containers 4 invertedly at the three opened-end holding portions 51a as illustrated in FIG. 13. As a result, even when the planter 9A holds the cultured earth 92 in a greater volume than the flowerpot 9 (shown in FIG. 1) employed in the First Preferred Embodiment, the water-supplying apparatus 1C can distribute water in a volume required by the plant 90 without shortage or overflow for a much longer period of time.

Moreover, note that the planter 9A having a predetermined weight is placed on the table 35 which is formed integrally with the water reservoir 3A. Consequently, even when the water-supplying containers 4 holding water therein are attached to the opened-end holding portions 51a, which are formed in the water-reservoir 3A of the water-supplying device 2A, the entire water-supplying apparatus 1C is stabilized so that it hardly falls down.

FIGS. 12 and 13 illustrate one of the actual applications of the present water-supplying apparatus 1C. In the application, two of the above-described water-supplying devices 2A are disposed in series.

Figure 14:
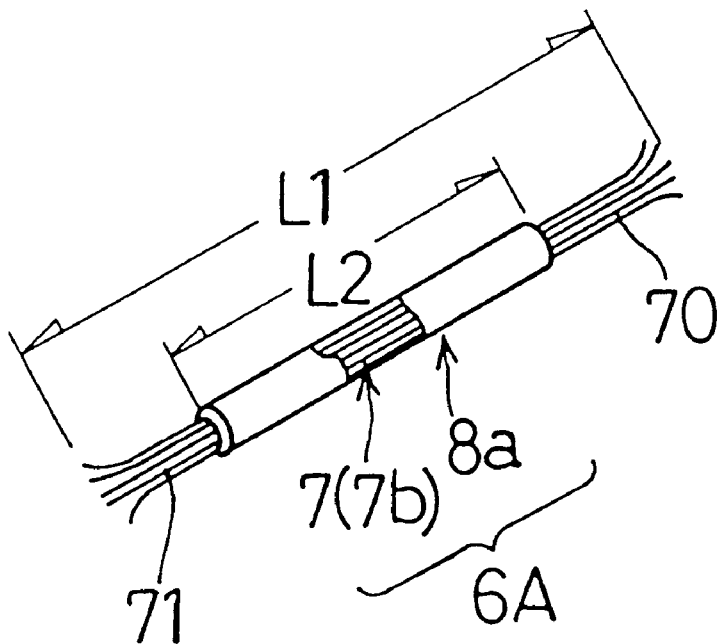
FIG. 14 illustrates an extension water distributor employed by the Fourth Preferred Embodiment in a perspective view.

Between the two water-supplying devices 2A, there is disposed an extension water distributor 6A so that water can be distributed therebetween. Except that the extension water distributor 6A employs a tube-shaped cover 8a as illustrated in FIG. 14, it has the same arrangements as those of the water distributor 6 which is used in the First through Third Preferred Embodiments. Alternatively, as illustrated in FIG. 15, the cover 8a can be fitted around a strip-shaped nonwoven cloth whose width is smaller than the inside diameter of the cover 8a. Accordingly, the resulting water distributor 6A has a reduced width at the intermediate portion. Moreover, the water distributor 6, which is used in the First through Third Preferred Embodiments, can be employed as it is for the extension water distributor 6A.

As illustrated in FIG. 13, the extension water distributor 6A is immersed in the water, which is held in the water reservoir 3A of one of the neighboring water-supplying devices 2A, at one end 70. Furthermore, the extension water distributor 6A is immersed in the water, which is held in the water reservoir 3A of another one of the neighboring water-supplying devices 2A, at another end 71.

Thus, the two water-supplying devices 2A are disposed in series so that the water can be distributed to the water reservoirs 3c with each other. If such is the case, it is possible to prolong the time period for unattendedly watering the plant 90 without shortage or overflow in an appropriate amount as required by the plant 90 much longer than the case where one and independent water-supplying device 2A is provided.

First Modified Version of the Fourth Preferred Embodiment

Figure 16:
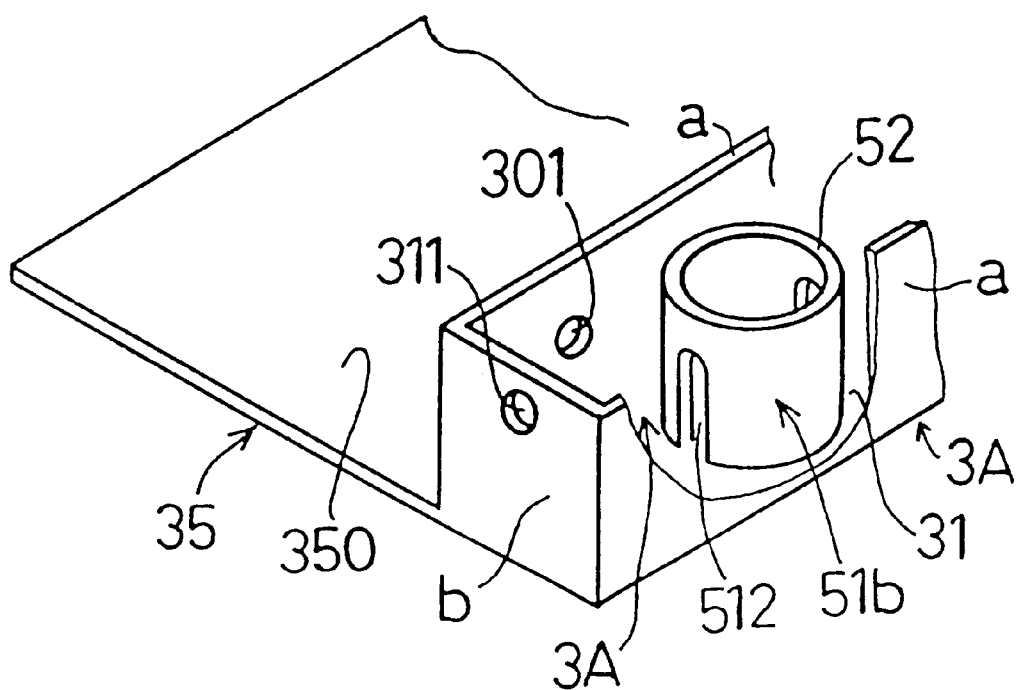
FIG. 16 is a part of a First Modified Version of the present water-supplying apparatus illustrated in FIG. 12 in which an opening is formed in the opened-end holding portions for holding the water-supplying containers in an inverted manner.
Figure 17:
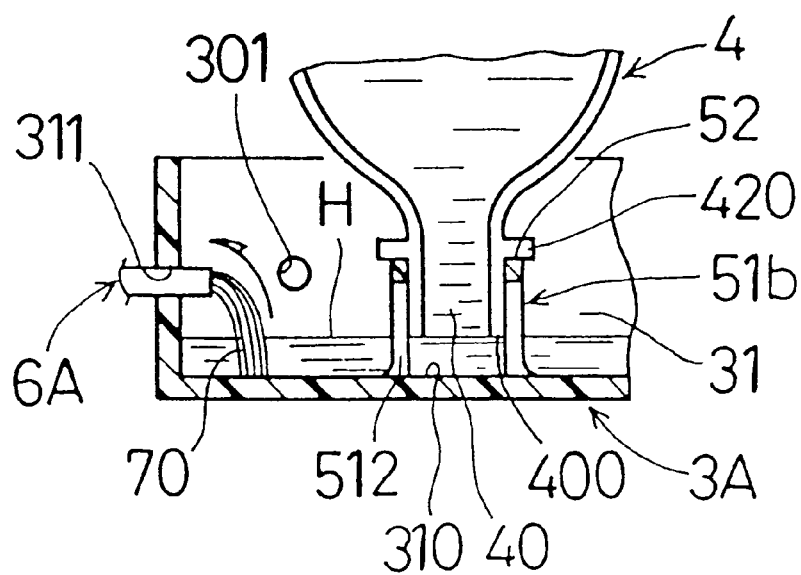
FIG. 17 is a partial cross-sectional view for illustrating how the water-supplying containers are held in an inverted manner by the opened-end holding portions illustrated in FIG. 16.

With reference to FIGS. 16 and 17, a First Modified Version of the Fourth Preferred Embodiment will be hereinafter described. The First Modified Version employs a modified version of the opened-end holding portion 51a formed in the water reservoir 3A of the present water-supplying apparatus 1C.

As illustrated in FIGS. 12 and 13, in the Fourth Preferred Embodiment, the slit-shaped openings 511 are made by removing the periphery of the opened-end holding portion 51 all the way up to the top end to communicate with the concaved member 31 of the water reservoir 3A. In the First Modified Version, instead of the slit-shaped openings 511, inverted letter-U-shaped openings 512 are formed in the opened-end holding portion 51b as shown in FIG. 16. The inverted letter-U-shaped openings 512 can be opened so that they are partially immersed in the water held down below in the concaved member 31 at the predetermined water level "H", or they can be opened so that the top end of them is flush with or above the predetermined water level "H". Except the inverted letter-U-shaped openings 512, the opened-end holding portion 51b of the First Modified Version has the same arrangements as those of the opened-end holding portion 51a of the Fourth Preferred Embodiment.

In the same manner as the opened-end holding portions 51a formed in the water reservoir 3A of the Fourth Preferred Embodiment, the opened-end holding portions 51b of the First Modified Version can hold the water-supplying containers 4, which hold water therein, invertedly. Likewise, the opened-end holding portions 51b can supply the water from the opening 40 of the water-supplying containers 4 to the concaved member 31 of the water reservoir 3A via the inverted letter-U-shaped openings 512.

Second Modified Version of the Fourth Preferred Embodiment

Figure 18:
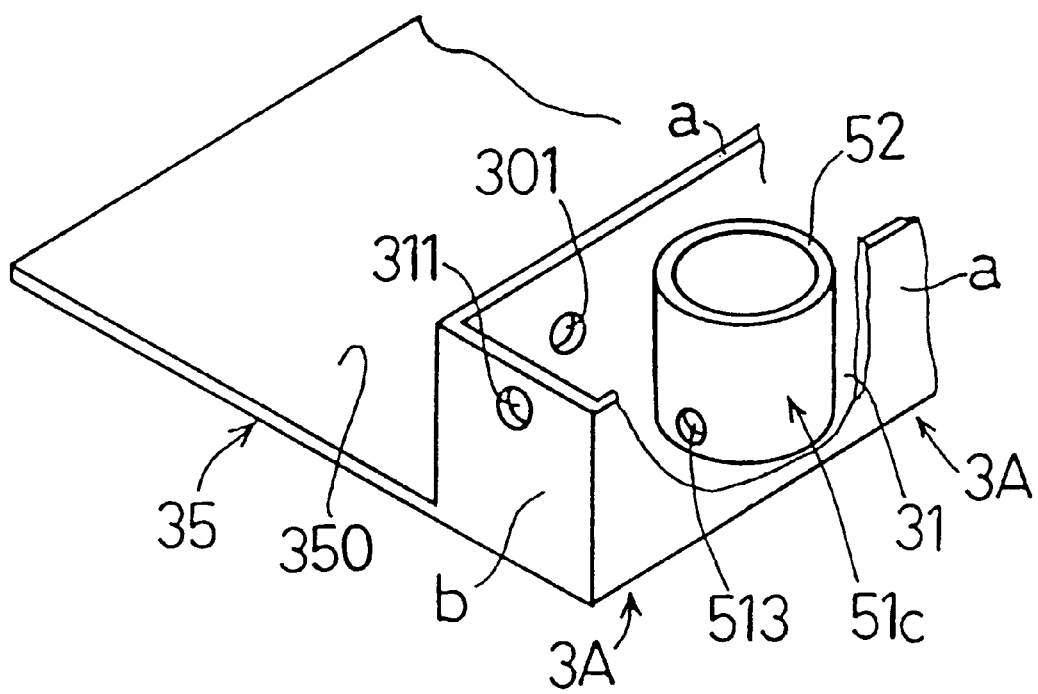
FIG. 18 is a part of a Second Modified Version of the present water-supplying apparatus illustrated in FIG. 12 in which another opening is formed in the opened-end holding portions for holding the water-supplying containers in an inverted manner.
Figure 19:
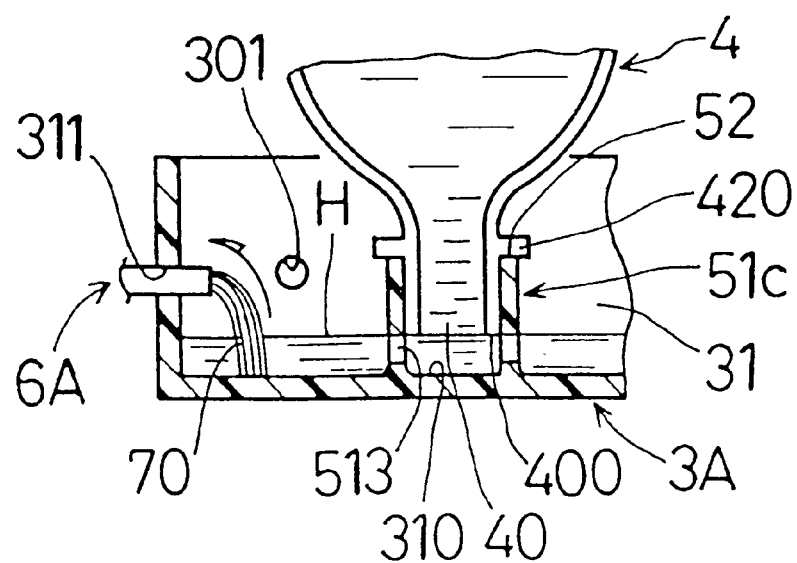
FIG. 19 is a partial cross-sectional view for illustrating how the water-supplying containers are held in an inverted manner by the opened-end holding portions illustrated in FIG. 18.

With reference to FIGS. 18 and 19, a Second Modified Version of the Fourth Preferred Embodiment will be hereinafter described. The Second Modified Version employs a modified version of the opened-end holding portion 51a formed in the water reservoir 3A in the present water-supplying, apparatus 1C.

In the Second Modified Version, instead of the slit-shaped openings 511 which are opened in the periphery of the opened-end holding portions 51a from the bottom end to the top end to communicate with the concaved member 31 of the water reservoir 3A, hole-shaped openings 513 are formed in the periphery of the opened-end holding portion 51c as shown in FIGS. 18 and 19. As illustrated in FIG. 19, the hole-shaped openings 513 can be opened so that they are partially immersed in the water held down below in the concaved member 31 at the predetermined water level "H", or they can be opened so that the top end of them is flush with or above the predetermined water level "H". Except the hole-shaped openings 513, the opened-end holding portion 51c of the Second Modified Version has the same arrangements as those of the opened-end holding portion 51a of the Fourth Preferred Embodiment.

In the same manner as the opened-end holding portions 51a formed in the water reservoir 3A of the Fourth Preferred Embodiment, the opened-end holding portions 51c of the Second Modified Version can hold the water-supplying containers 4, which hold water therein, invertedly. Likewise, the opened-end holding portions 51c can supply the water from the opening 40 of the water-supplying containers 4 to the concaved member 31 of the water reservoir 3A via the hole-shaped openings 513.

Third Modified Version of the Fourth Preferred Embodiment

Figure 20:
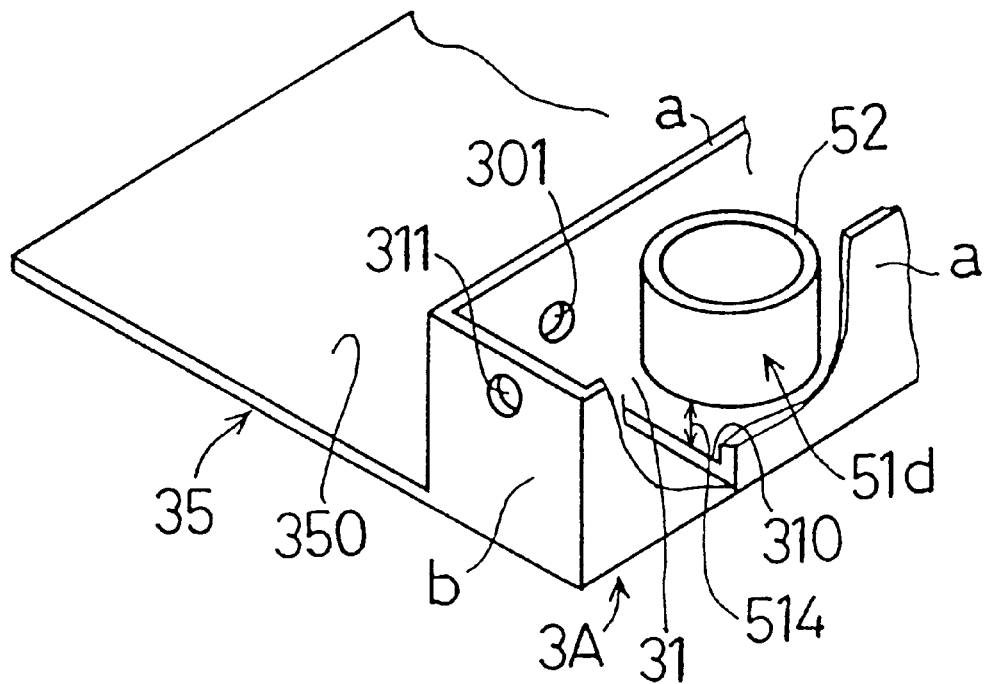
FIG. 20 is a part of a Third Modified Version of the present water-supplying apparatus illustrated in FIG. 12 in which still another opening is formed in the opened-end holding portions for holding the water-supplying containers in an inverted manner.
Figure 21:
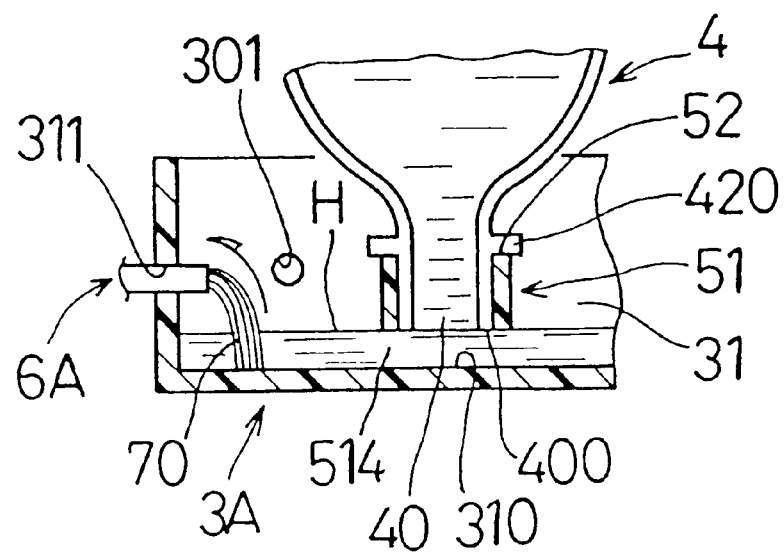
FIG. 21 is a partial cross-sectional view for illustrating how the water-supplying containers are held in an inverted manner by the opened-end holding portions illustrated in FIG. 20.

With reference to FIGS. 20 and 21, a Third Modified Version of the Fourth Preferred Embodiment will be hereinafter described. The Third Modified Version employs a modified version of the opened-end holding portion 51a formed in the water reservoir 3A in the present water-supplying apparatus 1C.

In the Third Modified Version, instead of the slit-shaped openings 511 which are opened in the periphery of the opened-end holding portions 51a from the bottom end to the top end to communicate with the concaved member 31 of the water reservoir 3A, gap-like openings 514 are formed at the bottom of the opened-end holding portion 51d as shown in FIGS. 20 and 21. As illustrated in FIG. 21, the gap-shaped openings 514 can be opened between the predetermined water level "H" and the inner bottom 310 of the concaved member 31, or they can be opened so that the top end of them is flush with or above the predetermined water level "H". Note that the opened-end holding portions 51d are formed integrally with the long-side walls "a", "a" of the concaved member 31. Except the gap-like openings 514, the opened-end holding portion 51d of the Third Modified Version has the same arrangements as those of the opened-end holding portion 51a of the Fourth Preferred Embodiment.

In the same manner as the opened-end holding portions 51a formed in the water reservoir 3A of the Fourth Preferred Embodiment, the opened-end holding portions 51d of the Third Modified Version can hold the water-supplying containers 4, which hold water therein, invertedly. Likewise, the opened-end holding portions 51d can supply the water from the opening 40 of the water-supplying containers 4 to the concaved member 31 of the water reservoir 3A via the gap-like openings 514.

Fifth Preferred Embodiment

The Fifth Preferred Embodiment (i.e., the present water-supplying apparatus 1D) will be hereinafter described with reference to FIG. 22.

Figure 22:
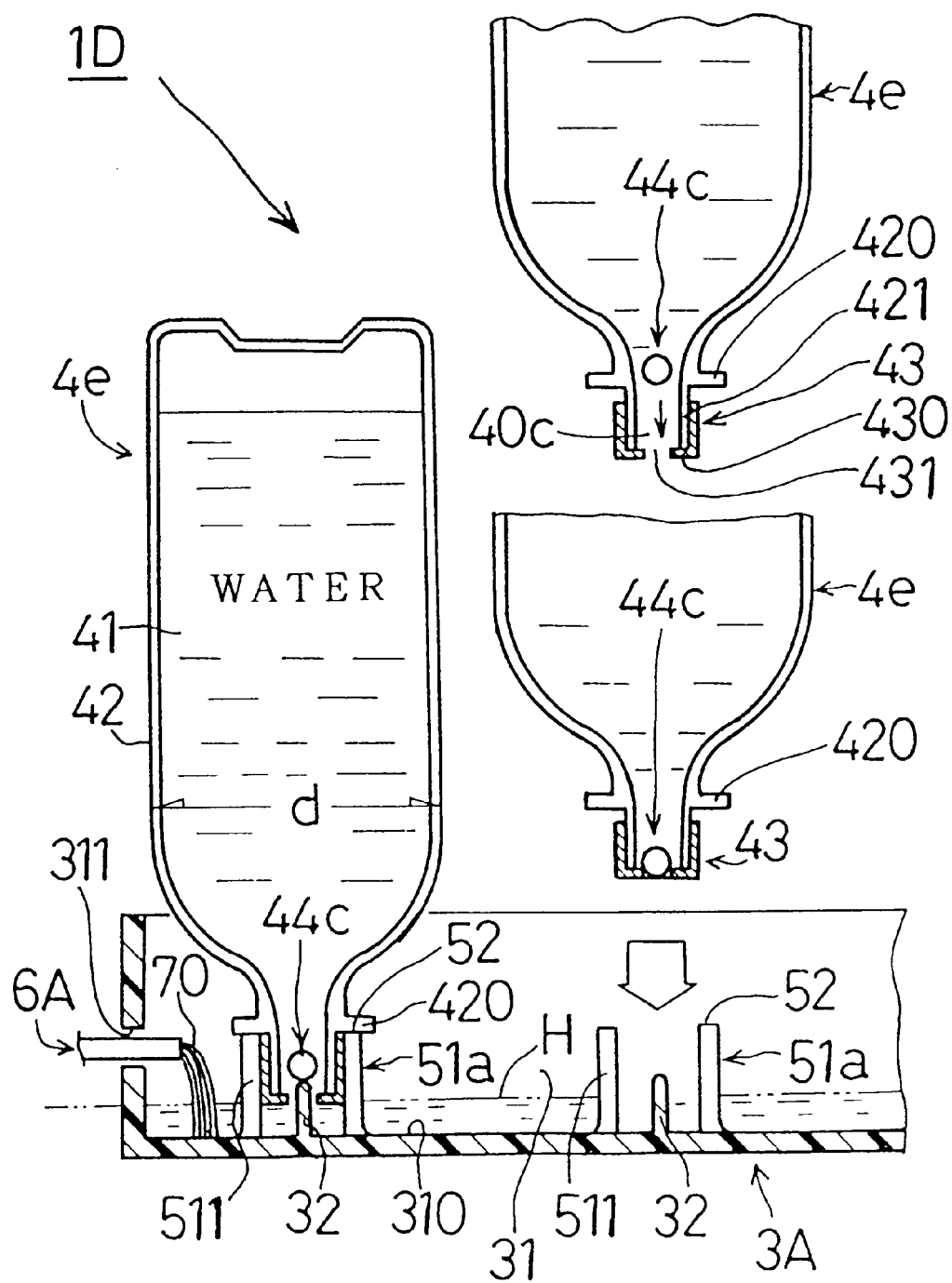
FIG. 22 is a cross-sectional view of a Fifth Preferred Embodiment of the present water-supplying apparatus, and illustrates the relationship between a riser, which is formed in a water reservoir thereof, and a ball-shaped check valve, which is formed in an opening of a water-supplying container thereof.

As illustrated in FIG. 22, except that the present water-supplying apparatus 1D is provided with a lid 43, a ball-shaped check valve 44c and a riser 32, it has the same arrangements as those of the Fourth Preferred Embodiment. The lid 43 is installed detachably to the reduced cylinder-shaped portion 421 which constitutes the opening 40c of the water-supplying containers 4e. The ball-shaped check valve 44c opens and closes the hole 431 which is formed in the central portion of the top 430 of the lid 43. The riser 32 is erected from the inner bottom 310 of the concaved portion 31 of the water reservoir 3A so that it pushes up the ball-shaped check valve 44c to open the hole 431 and opening 40c when the water-supplying container 4e is held invertedly by the opened-end holding portion 51.

When the riser 32 is fitted into the hole 431 which is formed in the central portion of the top 430 of the lid 43, the riser 32 provides an interval between itself and the hole 431. Accordingly, the water held in the inside 41 of the water-supplying container 4e can be supplied freely through the interval. Thus, the riser 32 has such a thickness that it can provide the interval when it is fitted into the hole 431.

In the present water-supplying apparatus 1D, the ball-shaped check valve 44c is accommodated in the inside 41 of the water-supplying container 4c beforehand. Then, the inside 41 of the ordinarily-erected water-supplying container 4e is replenished with water, and the opening 40a thereof is closed by installing the lid 43. The water-supplying container 4e is thereafter inverted. Accordingly, the ball-shaped check valve 44c falls onto the hole 431 of the lid 43 by its own weight, and closes the hole 431 of the lid 43 by its own weight and a hydraulic pressure. While the ball-shaped check valve 44c is closing the hole 431 of the lid 43, the water held in the water-supplying container 4e flows out through the hole 431 in a small amount virtually. However, the water is held in the inside 41 of the water-supplying container 4 in an ample amount. Finally, the water-supplying container 4e is held at the reduced cylinder-shaped portion 421 by the opened-end holding portion 51a in the inverted manner.

The inverted water-supplying container 4e is thus set to the water reservoir 3 as shown in FIG. 22. Note that, while the inverted water-supplying container 4e is transferred before the setting, the ball-shaped check valve 44c falls onto the hole 431 of the lid 43 by its own weight to close it by its own weight and a hydraulic pressure.

In addition, while the ball-shaped check valve 44c is closing the hole 431 of the lid 43 in the setting, the water held in the water-supplying container 4e flows out again through the hole 431 in a small amount virtually, however, the water is still held in the inside 41 of the water-supplying container 4 in an ample amount. Finally, the ball-shaped check valve 44c seats on the hole 431 to close the opening 40a of the water-supplying container 4e.

Thus, except for the concaved member 31 of the water reservoir 3, the water held in the water-supplying container 4e little leaks through the opening 40a while the water-supplying container 4d is held invertedly by the holder 5 in the water reservoir 3. In addition, all of the water held in the water-supplying container 4e can be utilized to keep the water held in the concaved member 31 of the water reservoir 3 at the predetermined water level "H".

The present water-supplying apparatus 1D operates and produces advantages in the same manner as the Fourth Preferred Embodiment. Moreover, in the present water-supplying apparatus 1D, the ball-shaped check valve 44c is not pushed up by the riser 32 of the water reservoir 3 until the water-supplying apparatus 4e is held invertedly by the holder 5 in the water reservoir 3. Consequently, the ball-shaped check valve 44c is separated from the hole 431 of the lid 43 against the hydraulic pressure which is exerted by the water held in the water-supplying container 4e. Then, the opening 40a of the water-supplying container 4e is opened forcibly. Finally, the water held in the water-supplying container 4e is supplied to the concaved member 31 of the water reservoir 3A. Thus, the water held in the water reservoir 3A can be kept at the predetermined water level "H". As a result, the present water-supplying apparatus 1C can utilize the water held in the water-supplying container 4e without loss.

Having now fully described the present invention, it will be apparent to one of ordinary skill in the art that many changes and modifications can be made thereto without departing from the spirit or scope of the present invention as set forth herein including the appended claims.

What is claimed is:

1. A water-supplying apparatus capable of keeping a predetermined water level therein, comprising:

a water-supplying device including a water reservoir holding water therein to a predetermined water level, a water-supplying container having an opened end and a closed end, disposed in an inverted manner so that the opened end is positioned in the water held in the water reservoir, and a holder holding the water-supplying container detachably in the water reservoir in the inverted manner;

a water distributor including a water-distributing member having a predetermined length, opposite ends and a peripheral portion, and distributing water by a capillary action from one of the opposite ends to another thereof, and a cover member covering the peripheral portion of the water-distributing member excepting the opposite ends thereof, and inhibiting water from leaking, one of the opposite ends of the water-distributing member being immersed in the water held in the water reservoir of said water-supplying device, and the other one of the opposite ends of the water-distributing member being disposed in a region where roots of a plant can be supplied with water; and a plurality of said water-supplying devices being disposed on an identical plane;

said water distributor further including a plurality of extension water distributors, the extension water distributor disposed between the neighboring water-supplying devices, and including an extension water-distributing member and an extension cover member, the extension water-distributing member having a predetermined length, opposite ends and a peripheral portion, the extension cover member covering the peripheral portion of the extension water-distributing member excepting the opposite ends thereof, and inhibiting water from leaking, one of the opposite ends of the extension water-distributing member being immersed in the water held in the water reservoir of one of the neighboring water-supplying devices, and the other one of the opposite ends of the extension water-distributing member being immersed in the water held in the water reservoir of another one of the neighboring water-supplying devices.

2. The water-supplying apparatus according to claim 1, wherein:

the water-supplying container is provided with a check valve at the opened end, the check valve being closed to inhibit water from leaking through the opened end when the water-supplying container is held and transferred in the inverted manner; and the water reservoir is provided with a riser for opening the check valve, the riser pushing up the check valve to open when the water-supplying container is installed to the water reservoir in the inverted manner.

3. The water-supplying apparatus according to claim 1, wherein:

said water-supplying device includes a plurality of the holders detachably holding a plurality of the water-supplying containers in the water reservoir in the inverted manner.

4. The water-supplying apparatus according to claim 1, wherein:

the holder of said water-supplying device is formed in the water reservoir.

5. The water-supplying apparatus according to claim 1, wherein:

the holder of said water-supplying device includes an opening being communicated with the water held in the water reservoir.

6. The water-supplying apparatus according to claim 1, wherein:

said water-supplying device further includes a table on which a container planted with a plant is placed.

7. The water-supplying apparatus according to claim 1, wherein the predetermined water level of the water held in the water reservoir of said water-supplying device is disposed below the region where roots of a plant can be supplied with water.

8. The water-supplying apparatus according to claim 1, wherein the opened end of the water-supplying container is flush with the predetermined water level.

* * * * *